(12) United States Patent
Samarev et al.

(10) Patent No.: US 11,741,376 B2
(45) Date of Patent: Aug. 29, 2023

(54) PREDICTION OF BUSINESS OUTCOMES BY ANALYZING VOICE SAMPLES OF USERS

(71) Applicant: OPENSESAME, INC., Portland, OR (US)

(72) Inventors: Roman Samarev, San Jose, CA (US); Ganesh Iyer, San Jose, CA (US)

(73) Assignee: OPENSESAME INC., Portland, OR (US)

( * ) Notice: Subject to any disclaimer, the term of this patent is extended or adjusted under 35 U.S.C. 154(b) by 1073 days.

(21) Appl. No.: 16/213,182

(22) Filed: Dec. 7, 2018

(65) Prior Publication Data

US 2020/0184343 A1 Jun. 11, 2020

(51) Int. Cl.
| | |
|---|---|
| G06F 3/048 | (2013.01) |
| G06N 5/02 | (2023.01) |
| G10L 15/22 | (2006.01) |
| G10L 15/02 | (2006.01) |
| G06Q 10/067 | (2023.01) |
| G10L 15/30 | (2013.01) |

(52) U.S. Cl.
CPC ............. *G06N 5/02* (2013.01); *G06Q 10/067* (2013.01); *G10L 15/02* (2013.01); *G10L 15/22* (2013.01); *G10L 15/30* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 7,502,748 B1 | 3/2009 | Baldwin et al. | |
| 7,885,902 B1 * | 2/2011 | Shoemaker | G06Q 50/01 |
| | | | 705/1.1 |
| 8,200,527 B1 | 6/2012 | Thompson et al. | |
| 8,204,809 B1 | 6/2012 | Wise | |
| 8,214,238 B1 | 7/2012 | Fairfield et al. | |
| 8,311,863 B1 | 11/2012 | Kemp | |
| 8,417,715 B1 | 4/2013 | Bruckhaus et al. | |
| 8,644,596 B1 | 2/2014 | Wu et al. | |
| 9,396,483 B2 | 7/2016 | Hamedi | |

(Continued)

OTHER PUBLICATIONS

Cap, A study of the usefulness and effectiveness of a self-instructional print module on multicultural behaviour change in apprentices in manitoba (Order No. 9525912). Available from ProQuest Dissertations and Theses Professional (Year: 1995).

(Continued)

*Primary Examiner* — Hua Lu
(74) *Attorney, Agent, or Firm* — BUCHALTER; Cecily Anne O'Regan

(57) ABSTRACT

A method and a system for predicting business outcomes by analyzing voice data of users are provided. The method includes generation of predictor models based on test data of test users. The test data includes historical data of the test users, voice samples of the test users, and answers provided by the test users to psychometric questions. The predictor models are then used to predict psychometric features and business outcomes based on target data of a target user. The target data includes voice samples of the target user, historical data of the target user, and answers provided by the target user to the psychometric questions.

20 Claims, 16 Drawing Sheets

(56) References Cited

U.S. PATENT DOCUMENTS

| | | | |
|---|---|---|---|
| 10,020,076 B1 | 7/2018 | Anumalasetty et al. | |
| 10,147,105 B1 | 12/2018 | Iyer et al. | |
| 10,990,847 B2 | 4/2021 | Samarev et al. | |
| 11,068,917 B2 | 7/2021 | Samarev et al. | |
| 11,238,391 B2 | 2/2022 | Iyer et al. | |
| 2002/0042786 A1* | 4/2002 | Scarborough | G09B 7/02 706/21 |
| 2002/0045154 A1 | 4/2002 | Wood et al. | |
| 2003/0130884 A1* | 7/2003 | Michaluk | G06Q 99/00 705/7.42 |
| 2004/0210661 A1* | 10/2004 | Thompson | H04L 67/306 709/228 |
| 2006/0229896 A1* | 10/2006 | Rosen | G06Q 10/1053 705/321 |
| 2006/0265269 A1 | 11/2006 | Hyder et al. | |
| 2007/0050215 A1 | 3/2007 | Kil et al. | |
| 2007/0094060 A1 | 4/2007 | Apps et al. | |
| 2007/0245379 A1 | 10/2007 | Agnihortri | |
| 2008/0015871 A1 | 1/2008 | Eder | |
| 2008/0065468 A1* | 3/2008 | Berg | G06Q 30/02 705/7.32 |
| 2008/0260218 A1 | 10/2008 | Smith et al. | |
| 2009/0018891 A1 | 1/2009 | Eder | |
| 2009/0094090 A1* | 4/2009 | Dow | G06Q 10/06 705/7.14 |
| 2009/0254971 A1 | 10/2009 | Herz et al. | |
| 2009/0276231 A1* | 11/2009 | Bazigos | G09B 7/00 705/320 |
| 2009/0327068 A1 | 12/2009 | Pradeep et al. | |
| 2011/0020778 A1 | 1/2011 | Forbes et al. | |
| 2013/0339099 A1 | 12/2013 | Aidroos | |
| 2014/0058794 A1 | 2/2014 | Malov et al. | |
| 2014/0082645 A1 | 3/2014 | Stern et al. | |
| 2014/0214709 A1 | 7/2014 | Greaney | |
| 2015/0006422 A1* | 1/2015 | Carter | G06Q 10/1053 705/321 |
| 2015/0161567 A1 | 6/2015 | Mondal et al. | |
| 2015/0310393 A1 | 10/2015 | Bhaskaran et al. | |
| 2015/0342511 A1 | 12/2015 | Goldberg | |
| 2016/0019411 A1 | 1/2016 | Bart et al. | |
| 2016/0078471 A1* | 3/2016 | Hamedi | G06F 16/90324 705/14.41 |
| 2016/0080485 A1 | 3/2016 | Hamedi | |
| 2016/0086089 A1 | 3/2016 | Ritchie et al. | |
| 2017/0124074 A1 | 5/2017 | Cama et al. | |
| 2017/0188976 A1 | 7/2017 | Kalra et al. | |
| 2017/0193533 A1 | 7/2017 | Lai et al. | |
| 2017/0213190 A1 | 7/2017 | Hazan | |
| 2017/0287473 A1 | 10/2017 | Levanon et al. | |
| 2017/0364744 A1 | 12/2017 | Savchenkov et al. | |
| 2017/0364857 A1* | 12/2017 | Suri | G06Q 10/067 |
| 2018/0018630 A1 | 1/2018 | Oni | |
| 2019/0034976 A1 | 1/2019 | Hamedi et al. | |
| 2020/0077942 A1* | 3/2020 | Youngblood | A61B 5/4884 |
| 2020/0082735 A1* | 3/2020 | Nel | G06F 3/011 |
| 2020/0184343 A1 | 6/2020 | Samarev et al. | |
| 2020/0184425 A1* | 6/2020 | Mondal | G06F 16/285 |
| 2020/0184529 A1 | 6/2020 | Samarev et al. | |
| 2020/0279622 A1* | 9/2020 | Heywood | G16H 15/00 |
| 2020/0327503 A1 | 10/2020 | Mendes et al. | |
| 2020/0342410 A1 | 10/2020 | Iyer et al. | |
| 2020/0349611 A1* | 11/2020 | Publicover | G06Q 30/0269 |
| 2021/0073737 A1* | 3/2021 | Flynn | G06N 5/04 |
| 2021/0183519 A1* | 6/2021 | Raz | G16H 20/10 |

OTHER PUBLICATIONS

Day, The relationship of the business with the in-house IT department: A customer-provider perspective (Order No. 10694424). Available from ProQuest Dissertations and Theses Professional (2003).

Hu et al., A Study on User Perception of Personality-Based Recommender Systems, Conference: User Modeling, Adaptation, and Personalization, 18th International Conference, UMAP 2010, Big Island, HI, USA, Jun. 20-24, 2010 (Year: 2010).

Pedersen, A quantitative examination of critical success factors comparing agile and waterfall project management methodologies (Order No. 3602588). Available from ProQuest Dissertations and Theses Professional (Year: 2013).

Prewitt, Edward. "Personality tests in hiring: how to do it right." Harvard Manag Update 3 (1998):8-10. (1998).

Robert, Brent, et al. "Personality measurement and assessment in large panel surveys." Forum for health economics & policy. 14(3). 1-23 (2011).

Stroop Effect, Wikipedia, Oct. 2018 https://web.archive.org/web/20181026055326/https://en.wikipedia.org/wiki/Stroop_effect (Year: 2018).

Sawleshwakar et al. "Simplified recruitment model using text-mining on psychometric and aptitude tests." 2018 Second International Conference on Electronics, Communication and Aerospace Technology (ICECA). IEEE, 2018.

* cited by examiner

PREDICTION OF BUSINESS OUTCOMES BY ANALYZING VOICE SAMPLES OF USERS

FIELD

Various embodiments of the disclosure relate generally to business enhancement using machine learning. More specifically, various embodiments of the disclosure relate to prediction of business outcomes by analyzing voice samples of users.

BACKGROUND

There are always risks associated with initiating new endeavors, especially in a business. The severity of these risks, however, may be substantially minimized if potential outcomes, both positive and negative, are predicted. For an individual, it may include getting suggestion for a suitable job profile, while for an organization, such as an e-commerce service provider, it may include identifying purchase behavior of customers to suitably adjust their inventory to target the customers. Likewise, for increasing work productivity and efficiency of employees, a business organization may determine job affinity of the employees and accordingly allocate different work profiles and tasks to the employees.

Psychometric analysis, further, plays an important role in identifying potential business outcomes for users and organizations. The conventional ways of psychometric analysis involve interviewing with psychologists, counselors, or therapists who observe conscious, subconscious, and semiconscious behavior of their interviewees. Such, interviews may be subject to personal judgement and bias of an interviewer. For example, different interviewers have different judgment capabilities. Hence, it is impractical to solely rely on their judgment for accurate and precise prediction results. Moreover, it may not be feasible to manually conduct psychometric analysis of a large number of users; for example, employees in an organization. Another known technique of conducting psychometric analysis involves analyzing psychosocial reactions of users to tests that simulate artificially created situations, such as Thematic Apperception Test (TAT), Word Association Test (WAT), and the like. However, such tests fail to consider recent activities and behavioral changes of the users for psychometric analysis, thus making the results of psychometric analyzes less accurate, which in turn results in identification of inaccurate business outcomes.

In light of the foregoing, there exists a need for a solution that overcomes aforementioned problems and provides accurate business outcomes.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

Prediction of business outcomes by analyzing voice samples of users is provided substantially as shown in, and described in connection with, at least one of the figures, as set forth more completely in the claims.

These and other features and advantages of the disclosure may be appreciated from a review of the following detailed description of the disclosure, along with the accompanying figures in which like reference numerals refer to like parts throughout.

DETAILED DESCRIPTION

Figure 1:
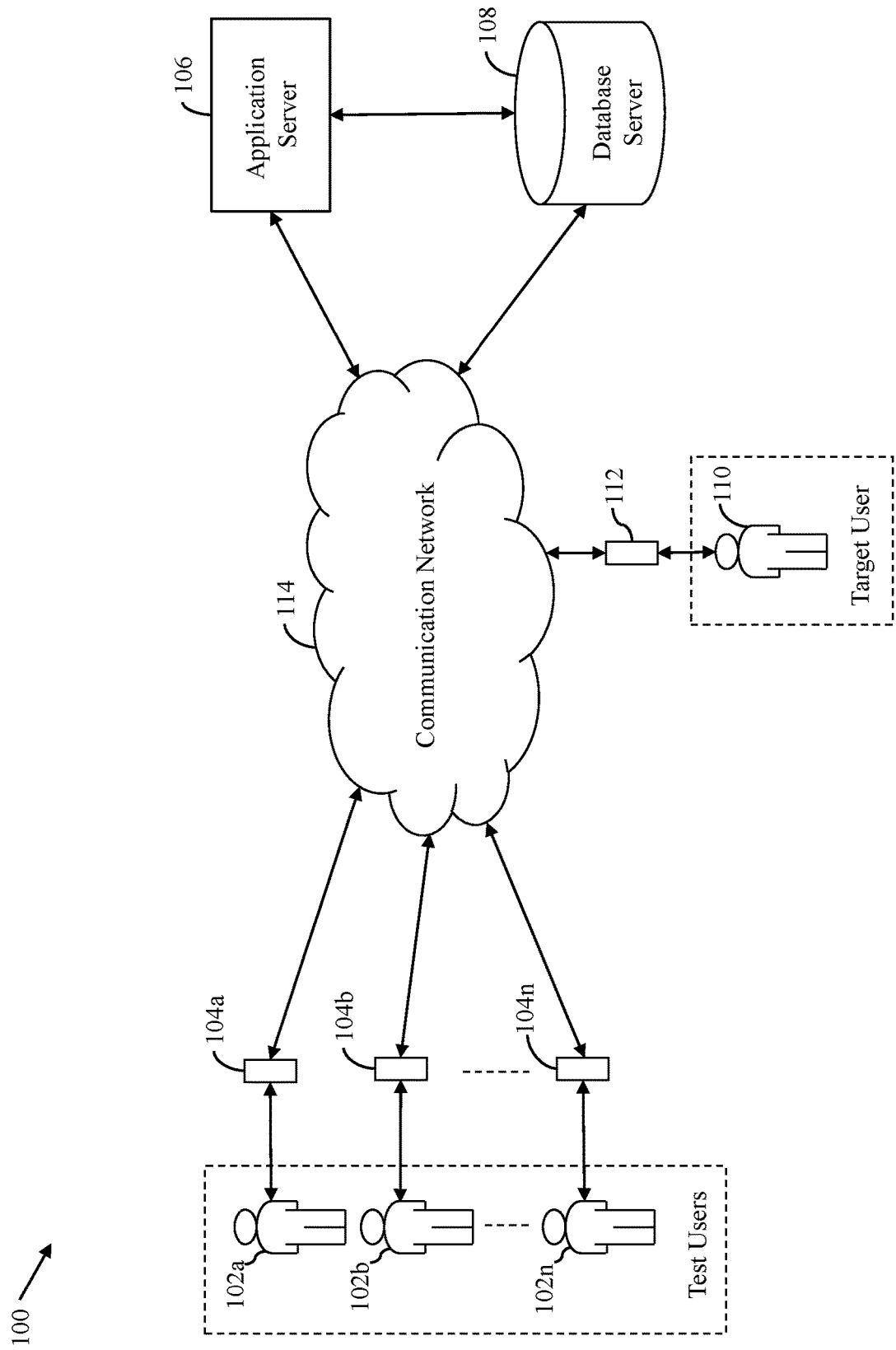
FIG. 1 is a block diagram that illustrates an exemplary environment for prediction of business outcomes by analyzing voice samples of users, in accordance with an embodiment of the disclosure.

Certain embodiments of the disclosure may be found in a disclosed apparatus for predicting business outcomes by analyzing voice samples of users. Exemplary aspects of the disclosure provide methods and systems for predicting business outcomes for users. The method includes retrieving, by a server, historical data of at least one test user, a first set of voice samples of the test user, and a first set of answers provided by the test user to a set of psychometric questions. The first set of answers and the first set of voice samples are analyzed by the server. The server may be configured to analyze the first set of answers for deriving one or more psychometric features of the test user. The server may be configured to analyze the first set of voice samples for extracting a first set of feature values corresponding to a set of voice features from the first set of voice samples. One or more predictor models are generated by the server based on the historical data of the test user, the first set of feature values, and the one or more psychometric features of the test user. One or more business outcomes for a target user are predicted by the server based on the one or more predictor models and a second set of voice samples associated with the target user.

Another embodiment provides the system for predicting business outcomes for users. The system includes a server that may be configured to retrieve historical data of at least one test user, a first set of voice samples associated with the test user, and a first set of answers provided by the test user to a set of psychometric questions. The server may be configured to analyze the first set of answers and the first set of voice samples. The first set of answers is analyzed for deriving one or more psychometric features of the test user. The first set of voice samples is analyzed for extracting a first set of feature values corresponding to a set of voice features from the first set of voice samples. The server may be configured to generate one or more predictor models based on the historical data of the test user, the first set of feature values, and the one or more psychometric features of the test user. The server may be configured to predict one or more business outcomes for a target user based on the one or more predictor models and a second set of voice samples associated with the target user.

The disclosure involves the prediction of business outcomes by analyzing voice, which accurately reflects one's subconscious mind. As the subconscious mind is responsible for a majority of decision-making tasks and is directly related to an individual's psychometric orientation, the disclosure yields more accurate results in comparison to related techniques. In one exemplary scenario, the predicted business outcomes may be used by an organization to improve marketing strategies and, in turn, expanding business. For example, the organization may target a specific group of customers that have high purchase affinity (i.e., a predicted business outcome) for a product launched by the organization. In another exemplary scenario, the predicted business outcomes may be used by an organization to improve resource management. For example, electronic commerce (e-commerce) industries may use the predicted business outcomes (such as predicted purchase trend) to manage their inventory. Likewise, airline industry may use the predicted business outcomes (such as predicted travel trend) to customize ticket prices to attract more customers.

FIG. 1 is a block diagram that illustrates an exemplary environment 100 for prediction of business outcomes by analyzing voice samples of users, in accordance with an embodiment of the disclosure. The environment 100 includes test users 102a-102n (hereinafter designated and referred to as "the test users 102"), test-user devices 104a-104n (hereinafter designated and referred to as "the test-user devices 104"), an application server 106, and a database server 108. The environment 100 further includes a target user 110 and a target-user device 112. The test-user devices 104, the application server 106, the database server 108, and the target-user device 112 may communicate with each other by way of a communication network 114 or any other communication means established therebetween.

The test users 102 are individuals, whose test data may be used by the application server 106 for generating predictor models that predict business outcomes. The test data of each test user 102 may include historical data of the corresponding test user 102, voice samples of the corresponding test user 102, and answers provided by the corresponding test user 102 to various psychometric questions. The historical data of the test users 102 may refer to data collected based on past events pertaining to the test users 102. The historical data may include data generated either manually or automatically by the test users 102. For example, the voice samples of the test user 102a may include voice recordings of the test user 102 recorded in real-time by way of the test-user device 104a. The voice samples of the test user 102a may further include previously recorded voice recordings that are uploaded on the internet or a social media platform by the test user 102a. The historical data of the test user 102a may include, but is not limited to, educational qualifications, past and present job profiles, purchase history, and travel history of the test user 102a. The historical data of the test user 102a may further include an activity log of the test user 102a on the internet and various social media platforms. For example, with consent of the test user 102a, the historical data may be extracted from a social media profile of the test user 102a. The answers to the psychometric questions may be provided by the test user 102a when the psychometric questions are presented to the test user 102a through various online tests (such as, but not limited to, the multiple intelligence quiz, the BIG 5, or the personal globe inventory) on the test-user device 104a. The voice samples of the test user 102a may include voice recordings of the test user 102a.

The test-user devices 104 may include suitable logic, circuitry, interfaces, and/or code, executable by the circuitry, that may be configured to perform one or more operations for providing the test data of the test users 102a-102n to the application server 106. In one exemplary scenario, the test-user devices 104 may refer to communication devices of the test users 102. The test-user devices 104 may be configured to allow the test users 102 to communicate with the application server 106 and the database server 108. The test-user devices 104 may be configured to serve as an interface for providing the test data of the test users 102 to the application server 106. In one embodiment, the test-user device 104a may be configured to run or execute a software application (e.g., a mobile application or a web application), which may be hosted by the application server 106, for presenting various psychometric questions to the test user 102a for answering. The test-user device 104a may be configured to communicate the answers provided by the test user 102a to the psychometric questions to the application server 106. The test-user device 104a may be further configured to run or execute the software application for accessing various voice recordings of the test user 102a that are stored in a memory (not shown) of the test-user device 104a or uploaded on the social media profile of the test user 102a. The test-user device 104a may be further configured to access, with the consent of the test user 102a, the social media profile of the test user 102a for retrieving the historical data of the test user 102a. Likewise, the test-user devices 104 of the other test users 102 may be configured to provide the test data to the application server 106. Examples of the test-user devices 104 may include, but are not limited to, mobile phones, smartphones, laptops, tablets, phablets, or other devices capable of communicating via the communication network 114.

The application server 106 may include suitable logic, circuitry, interfaces, and/or code, executable by the circuitry, that may be configured to perform one or more operations for predicting business outcomes. The application server 106 may be a physical or cloud data processing system on which a server program runs. The application server 106 may be implemented in hardware or software, or a combination thereof. The application server 106 may be configured to host the software application which may be accessible on the internet for providing a personality and business outcomes prediction service. The application server 106 may be configured to utilize the software application for retrieving the test data of the test users 102. The application server 106 may be further configured to use a tracker or a web crawler to track the activities of the test users 102 on the internet and the social media platforms for retrieving the test data. The application server 106 may be configured to implement a learning phase based on the test data for generating the predictor models. The predictor models may be statistical predictive models generated by means of machine learning algorithms. Examples of the algorithms used for generating the predictor models may include, but are not limited to, a Support Vector Machine (SVM), a Logistic Regression model, a Bayesian Classifier model, a Decision Tree Classifier, a Copula-based Classifier, a K-Nearest Neighbors (KNN) Classifier, a Random Forest (RF) Classifier, or Artificial neural networks.

After the generation of the predictor models, the application server 106 may be configured to utilize the predictor models during a prediction phase to predict the business outcomes for the target user 110 based on various inputs received from the target user 110 (the inputs received from the target user 110 are hereinafter designated and referred to as "target data"). In one embodiment, the business outcomes may include employment suggestions, compatibility match, product purchase affinity, color affinity, work affinity, and/or the like. In another embodiment, the business outcomes may include work affinity of employees, inventory suggestions, travel trend, purchase trend, and/or the like.

The application server 106 may be realized through various web-based technologies, such as, but not limited to, a Java web-framework, a .NET framework, a PHP framework, or any other web-application framework. Examples of the application server 106 include, but are not limited to, a computer, a laptop, a mini-computer, a mainframe computer, a mobile phone, a tablet, and any non-transient, and tangible machine that can execute a machine-readable code, a cloud-based server, or a network of computer systems. Various functional elements of the application server 106 have been described in detail in conjunction with FIG. 2. Generation of the predictor models is described later in FIG. 3.

The database server 108 may include suitable logic, circuitry, interfaces, and/or code, executable by the circuitry, that may be configured to perform one or more operations for managing and storing data, such as the test data of the test users 102, the target data of the target user 110, and the predictor models. The database server 108 may be configured to receive a query from the application server 106 to extract the data stored in the database server 108. Based on the received query, the database server 108 may be configured to provide the requested data to the application server 106 over the communication network 114. In one embodiment, the database server 108 may be configured to implement as a local memory of the application server 106. In another embodiment, the database server 108 may be configured to implement as a cloud-based server. Examples of the database server 108 may include, but are not limited to, MySQL® and Oracle®.

The target user 110 may be an individual, whose target data may be used as input to the predictor models for predicting business outcomes. In one exemplary scenario, the target user 110 may be an individual interested in determining a compatibility match or an individual seeking suggestion regarding employment. In another exemplary scenario, the target user 110 may be a representative of an organization who wants to know future business outcomes pertaining to a new policy implementation. In another exemplary scenario, the target user 110 may be an employee of the organization, whose employment affinity (i.e., a business outcome) is of interest to the organization. In another exemplary scenario, the target user 110 may be a customer in conversation with a sales representative of an organization, such as an e-commerce organization. The target data may include historical data of the target user 110, voice samples of the target user 110, and/or answers provided by the target user 110 to the psychometric questions. The application server 106 may be configured to obtain the target data in a manner that is similar to obtaining the test data of the test users 102. In one embodiment, the application server 106 may be configured to retrieve the voice samples of the target user 110 in real time, while the target user 110 is indulged in a conversation accessible to the application server 106.

The target-user device 112 may include suitable logic, circuitry, interfaces, and/or code, executable by the circuitry, that may be configured to perform one or more operations for providing the target data of the target user 110 to the application server 106. In one exemplary scenario, the target-user device 112 may refer to a communication device of the target user 110. The target-user device 112 may be configured to allow the target user 110 to communicate with the application server 106 and the database server 108. In one embodiment, the target-user device 112 may be configured to provide the target data to the application server 106. For example, the target-user device 112 may be configured to run or execute the software application, which is hosted by the application server 106, for presenting the psychometric questions to the target user 110 for answering. The target-user device 112 may be configured to communicate the answers provided by the target user 110 to the application server 106. The target-user device 112 may be configured to obtain a consent of the target user 110 for retrieving various voice recordings of the target user 110 stored in the memory of the target-user device 112 or uploaded on the social media profile of the target user 110. The target-user device 112 may be further configured to communicate the retrieved voice recordings to the application server 106. The target-user device 112 may be further configured to retrieve the historical data of the target user 110 by accessing the social media profile of the target user 110 based on a consent of the target user 110 and provide the retrieved historical data to the application server 106. Examples of the target-user device 112 may include, but are not limited to, mobile phones, smartphones, laptops, tablets, phablets, or other devices capable of communicating via the communication network 114.

The communication network 114 may include suitable logic, circuitry, interfaces, and/or code, executable by the circuitry, that may be configured to transmit content and messages between various entities, such as the test-user devices 104, the application server 106, the database server 108, and/or the target-user device 112. Examples of the communication network 114 may include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 114 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the application server 106 may be configured to predict the business outcomes in two phases, such as the learning and prediction phases. The learning phase may focus on generation of the predictor models. During the learning phase, the application server 106 may be configured to retrieve the test data from the test users 102. The test data may include the historical data of the test users 102, the voice samples of the test users 102, and the answers provided by the test users 102 to the psychometric questions. During the learning phase, the application server 106 may be configured to analyze the test data for generating the predictor models. For example, the voice samples corresponding to the test users 102 may be analyzed to extract the feature values for the voice features. The answers provided by the test users 102 may be analyzed to derive psychometric features, such as personality attributes and mood attributes, of the test users 102. The psychometric features may refer to behavioral qualities or characteristics of an individual's persona. Personality attributes (such as BIG5 attributes and RIASAC Holland occupational themes) are one example of psychometric features. As per BIG5 attributes, the personality attributes may be classified into five areas of: neuroticism, openness, conscientiousness, extraversion, and agreeableness. The mood attributes may be classified as cheerful, sad, disappointed, happy, confident, or the like. As per RIASAC Holland occupational themes, the personality attributes may be classified into six categories: Realistic (Doers), Investigative (Thinkers), Artistic (Creators), Social (Helpers), Enterprising (Persuaders), and Conventional (Organizers). Other examples of psychometric features may include, but are not limited to, Gardener's Multiple Intelligences theory related attributes, emotional attributes, aesthetic preferences, and the like. Likewise, the historical data of each test user 102 may be cleaned and normalized to remove irrelevant information. The application server 106 may be further configured to utilize the analyzed test data as input for the machine learning algorithms to generate the predictor models. The analyzed test data and the predictor models may be stored in the database server 108.

The learning phase may be followed by the prediction phase. During the prediction phase, the application server 106 may be configured to retrieve the target data of the target user 110. The target data may include one or more voice samples corresponding to the target user 110, answers provided by the target user 110 to the psychometric questions, and/or the historical data of the target user 110. The application server 106 may be further configured to analyze the target data for predicting the business outcomes. For example, the answers provided by the target user 110 may be analyzed to derive the psychometric features, such as personality and mood attributes, of the target user 110 and the voice samples of the target user 110 may be analyzed to extract feature values corresponding to the voice features. In one embodiment, the application server 106 may be further configured to analyze the voice sample and the historical data of the target user 110 to predict psychometric features of the target user 110. The application server 106 may be further configured to use the derived and predicted psychometric features, the extracted feature values, and/or the analyzed historical data as input to the predictor models for predicting the business outcomes. The learning phase is explained in detail in conjunction with FIG. 3 and the prediction phase is explained in detail in conjunction with FIGS. 4-7.

Figure 2:
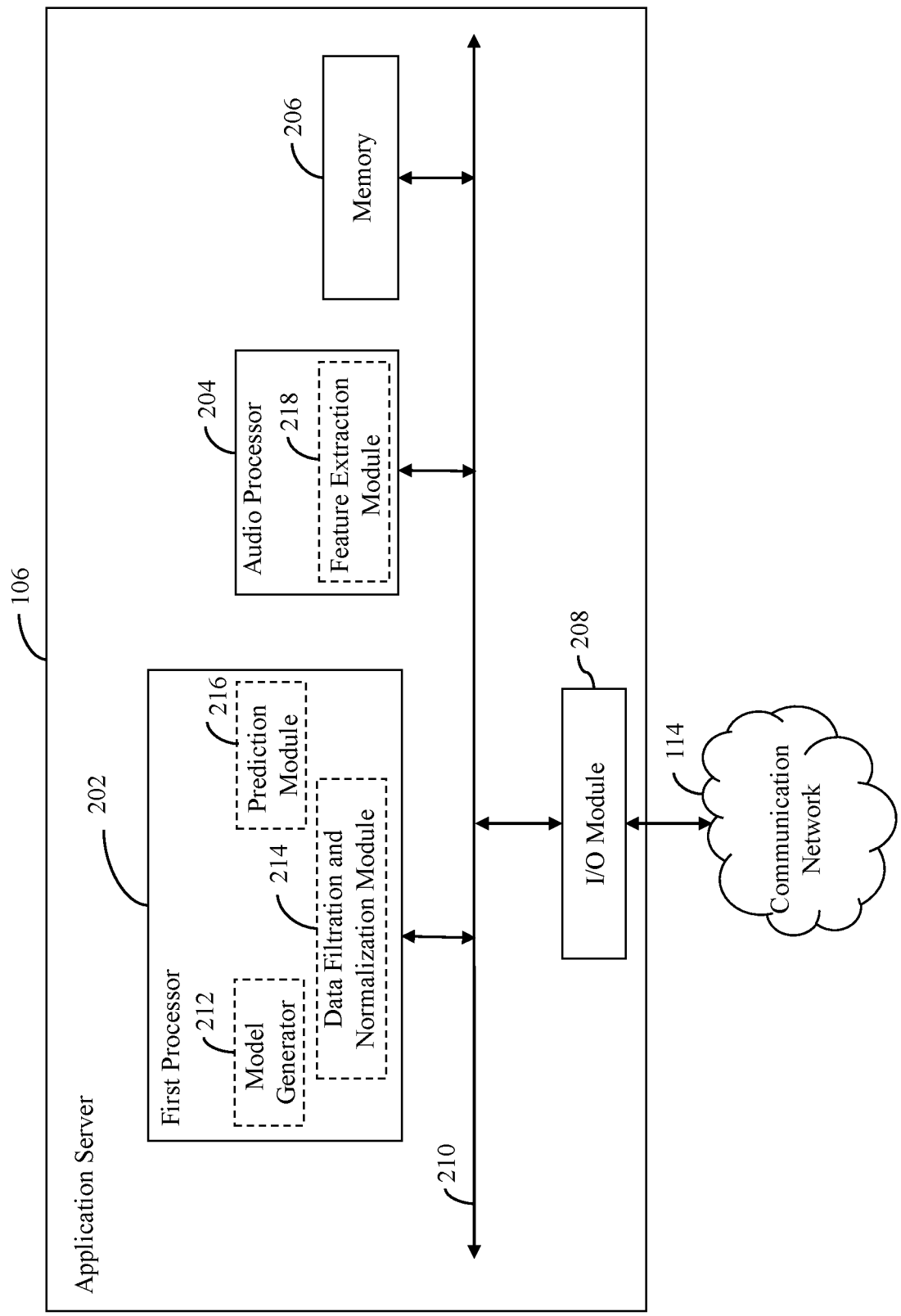
FIG. 2 is a block diagram that illustrates an application server of FIG. 1, in accordance with an embodiment of the disclosure.

FIG. 2 is a block diagram that illustrates the application server 106, in accordance with an embodiment of the disclosure. The application server 106 may include a first processor 202, an audio processor 204, a memory 206, and an input/output (I/O) module 208. The first processor 202, the audio processor 204, the memory 206, and the I/O module 208 may communicate with each other by means of a communication bus 210.

The first processor 202 may include suitable logic, circuitry, interfaces, and/or code, executable by the circuitry, that may be configured to perform one or more operations for implementing the learning and prediction phases. The first processor 202 may be configured to obtain the test data of the test users 102 and the target data of the target user 110. The first processor 202 may be configured to analyze the answers provided by the test users 102 and the target user 110 to the psychometric questions to derive psychometric features for the test users 102 and the target user 110, respectively. Examples of the psychometric features may include, but are not limited to, skills and knowledge, abilities, attitudes, mood attributes, aesthetic preferences, and personality attributes. The first processor 202 may include multiple functional blocks, such as: a model generator 212, a data filtration and normalization module 214, and a prediction module 216. Examples of the first processor 202 may include, but are not limited to, an application-specific integrated circuit (ASIC) processor, a reduced instruction set computing (RISC) processor, a complex instruction set computing (CISC) processor, a field-programmable gate array (FPGA), and the like.

The audio processor 204 may include suitable logic, circuitry, interfaces, and/or code, executable by the circuitry, that may be configured to execute one or more operations for voice analysis. The audio processor 204 may include a feature extraction module 218. The feature extraction module 218 may include suitable logic, circuitry, interfaces, and/or code, executable by the circuitry, that may be configured to extract feature values for various voice features from the voice samples associated with the test users 102 and the target user 110. The voice features may include, but are not limited to, paralinguistic features, linguistic features, sound features, and the like. The paralinguistic features may be associated with paralanguage aspect of spoken communication and include tone, prosody, volume, or the like. The linguistic features, such as phonemes or the like, are associated with language aspect of spoken communication. The sound features may include analysis of pitch, signal energy, mel-spectrum, cepstral coefficients, formants, or the like. Examples of the audio processor 204 may include, but are not limited to, a digital signal processor (DSP), an ASIC processor, a RISC processor, a CISC processor, an FPGA, and the like.

The model generator 212 and the filtration and normalization module 214 may include suitable logic, circuitry, interfaces, and/or code, executable by the circuitry, that may be configured to implement the learning phase for generating the predictor models. During the learning phase, the test data may be received and analyzed. For example, the model generator 212 may be configured to analyze the answers provided by the test users 102 for deriving the psychometric features of the test users 102, the data filtration and normalization module 214 may be configured to analyze the historical data of the test users 102, and the feature extraction module 218 may be configured to analyze the voice samples associated with the test users 102. The model generator 212 may be configured to use the normalized and filtered historical data, the derived psychometric features, and the extracted feature values for generating the predictor models. For the generation of the predictor models, the model generator 212 may be configured to use various machine learning algorithms such as, but not limited to, regression based predictive learning and neural networks based predictive leaning. In one embodiment, the model generator 212 may be further configured to update the predictor models to improve its prediction accuracy based on a feedback provided by the target user 110 on relevance of the predicted business outcomes.

The data filtration and normalization module 214 may be configured to normalize and filter the historical data of the test users 102 and the target user 110. For example, the data filtration and normalization module 214 may be configured to filter the commonly used words (such as "the", "is", "at", "which", "on", and the like) as irrelevant information from the historical data and normalize the remaining historical data to make it more meaningful. In another example, the historical data may be filtered to parse specific keywords such as, but not limited to, identifying a stream of numbers that may represent a mobile number, extracting keywords related to personality, mood, job, likes, dislikes, and the like. In another example, the historical data may be filtered to extract one or more named entities which are related to specific objects or actions (for example, identifying full name of an institution by recognizing informal name of the institution in a post) and to recognize one or more activities which are mentioned indirectly (for example, recognizing a type of sport activity by referring a place description or a club name in a post).

The prediction module 216 may include suitable logic, circuitry, interfaces, and/or code, executable by the circuitry, that may be configured to implement the prediction phase for predicting the business outcomes by using the target data as input to the predictor models. In one embodiment, the prediction module 216 may be configured to use the predictor models to predict psychometric features based on the analyzed historical data and the extracted feature values of the voice features extracted from the voice samples associated with the target user 110. The predicted psychometric features may also be used for predicting the business outcomes. The feature extraction module 218 may be configured to analyze the voice samples of the test users 102 and the target user 110 to extract feature values for various voice features.

The memory 206 may include suitable logic, circuitry, interfaces, and/or code, executable by the circuitry, that may be configured to store the instructions and/or code that enable the first processor 202 and the audio processor 204 to execute their operations. In one embodiment, the memory 206 may be configured to store the test data, the target data, and the predictor models. Examples of the memory 206 may include, but are not limited to, a random-access memory (RAM), a read-only memory (ROM), a removable storage drive, a hard disk drive (HDD), a flash memory, a solid-state memory, and the like. It will be apparent to a person skilled in the art that the scope of the disclosure is not limited to realizing the memory 206 in the application server 106, as described herein. In another embodiment, the memory 206 may be realized in form of a cloud storage working in conjunction with the application server 106, without departing from the scope of the disclosure.

The I/O module 208 may include suitable logic, circuitry, interfaces, and/or code, executable by the circuitry, that may be configured to transmit and receive data to (or form) various entities, such as the test-user devices 104, the target-user device 112, and/or the database server 108 over the communication network 114. Examples of the I/O module 208 may include, but are not limited to, an antenna, a radio frequency transceiver, a wireless transceiver, a Bluetooth transceiver, an Ethernet port, a universal serial bus (USB) port, or any other device configured to transmit and receive data. The I/O module 208 may be configured to communicate with the test-user devices 104, the target-user device 112, and the database server 108 using various wired and wireless communication protocols, such as TCP/IP, UDP, LTE communication protocols, or any combination thereof.

Figure 3:
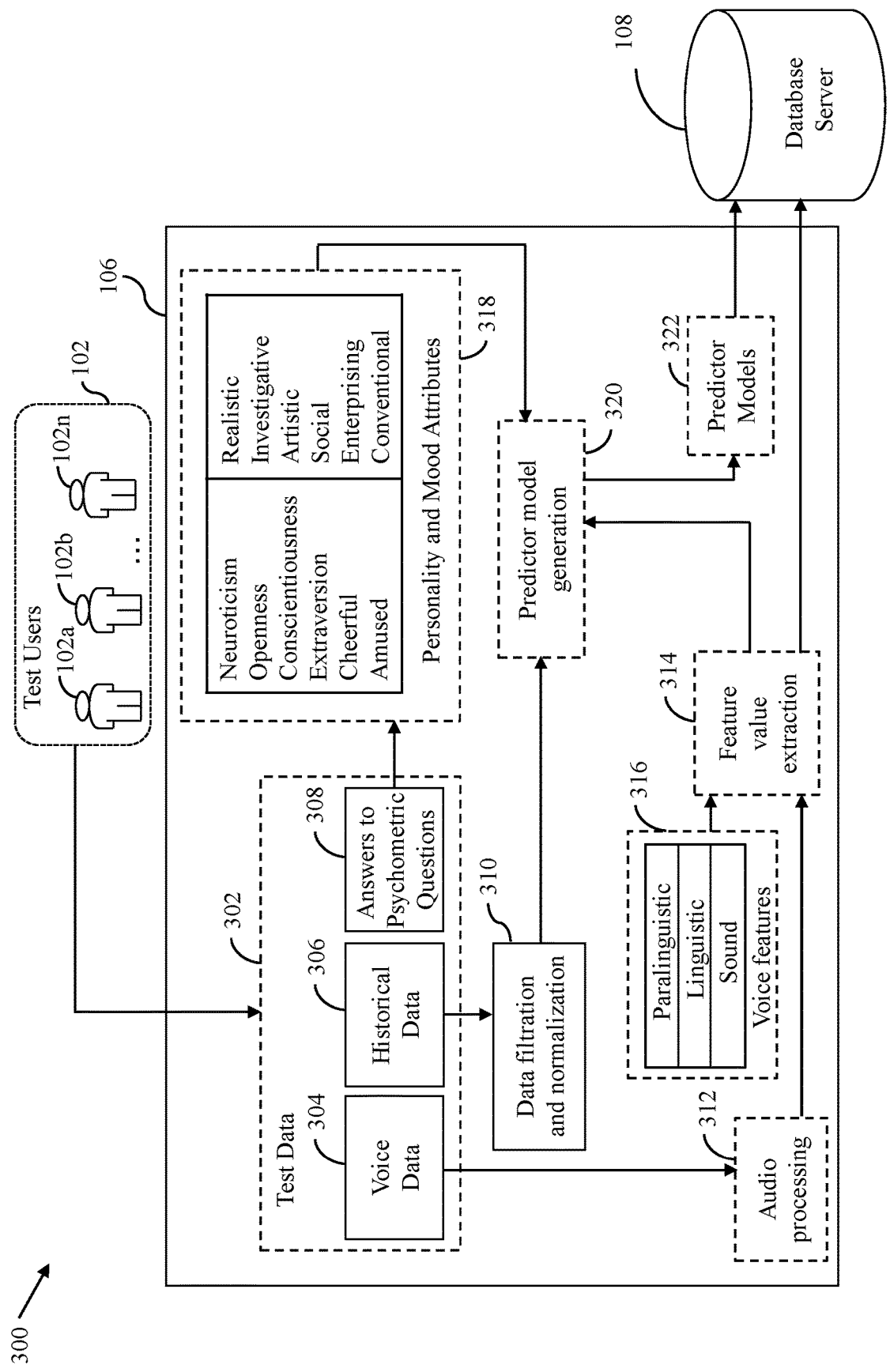
FIG. 3 is a block diagram that illustrates an exemplary scenario for generating predictor models, in accordance with an exemplary embodiment of the disclosure.

FIG. 3 is a block diagram that illustrates an exemplary scenario 300 for generating predictor models, in accordance with an exemplary embodiment of the disclosure. The exemplary scenario 300 involves the test users 102, the application server 106, and the database server 108. The application server 106 may be configured to retrieve test data 302 of the test users 102 as a part of the learning phase. The test data 302 may include voice data 304 of the test users 102, historical data 306 of the test users 102, and answers 308 provided by the test users 102 to various psychometric questions. For the sake of simplicity, the retrieval of the test data 302 is explained with respect to the test user 102a. However, it will be apparent to a person of ordinary skill in the art that the application server 106 may be configured to retrieve the test data 302 of other test users 102b-102n in a similar manner as described for the test user 102a.

With reference to the test user 102a, the voice data 304 may include voice samples of the test user 102a and corresponding date and time markers of the voice samples. The date and time markers of a voice sample indicate a date and time of a recording of the voice sample by a test user, such as the test user 102a. The application server 106 may be configured to utilize the software application that runs on the test-user device 104a to retrieve, with the consent of the test user 102a, the voice data 304 stored in the memory of the test-user device 104. For example, the software application may retrieve, with the consent of the test user 102a, the voice recordings of the test user 102a stored in the memory of the test-user device 104a. In another example, the software application may be further configured to access and retrieve, with the consent of the test user 102a, the voice recordings of the test user 102a that the test user 102a has posted on the test users social media profile. In another example, the software application may be configured to prompt the test user 102a to record and upload the test user's 102a voice samples to the application server 106.

The historical data 306 of the test user 102a may include, but is not limited to, the curriculum information, the education particulars, the travel history, the employment details, the purchase history of the test user 102a, and one or more posts that are shared, followed, and liked by the test user 102a on the internet and the social media platform. For example, the test-user device 104a, executing the software application hosted by the application server 106, may be configured to access the activity log of the test user 102a on the internet to obtain the travel history and the purchase history of the test user 102a. Based on a consent of the test user 102a, the test-user device 104a may be configured to access the social media profile (for example LinkedIn®, Facebook®, or the like) of the test user 102a to retrieve the education and job particulars of the test user 102a on the social media profile. The application server 106 may be configured to communicate a questionnaire to the test-user device 104a regarding the historical data of the test user 102a. The test-user device 104a may be configured to communicate to the application server 106 a response provided by the test user 102a to the questionnaire and the application server 106 may be configured to the include the response of the test user 102a in the historical data 306.

The application server 106 may be further configured to prompt the test user 102a by way of the test-user device 104a to take one or more online tests (such as, but not limited to, the multiple intelligence quiz, the BIG 5, or the personal globe inventory) that include the psychometric questions. The answers 308 to the psychometric questions are then provided by the test user 102a and communicated to the application server 106 by the test-user device 104a. In one exemplary scenario, the psychometric questions may include one hundred questions each of which is associated with a linear scale. For example, the linear scale may be scored from 0 to 9, where score '0' means there is no correlation between the test user 102a and a question statement and score '9' means the test user 102a and the question statement completely corelate. In this scenario, the answer 308 to each psychometric question may be a score selected by the test user 102a from the linear scale. In another exemplary scenario, the psychometric questions may include one hundred questions each of which is associated with a set of options, such as four options, having a specific score associated thereto. The test user 102a may be required to select one or more options from the set of options for each psychometric question as the answer. It will be apparent to a person of skill in the art that the abovementioned examples are for illustrative purpose and should not be construed to limit the scope of the disclosure. In another embodiment, the application server 106 may be configured to retrieve the answers 308 from third-party servers (not shown) that conduct psychometric analysis of various users via online tests.

After retrieving the test data 302 of the test users 102, the application server 106 may be configured to process the test data 302. Processing of the test data 302 may involve filtering and normalizing the historical data 306 (as represented by block 310). The historical data 306 retrieved from the test users 102 may include irrelevant information. Thus, the data filtration and normalization module 214 may be configured to filter and normalize the historical data 306 so that only relevant information is processed further. For example, the data filtration and normalization module 214 may be configured to filter the commonly used words (such as "the", "is", "at", "which", "on", and the like) as irrelevant information from the historical data 306 and normalize the remaining historical data to make it more meaningful. In another example, the data filtration and normalization module 214 may be configured to parse specific keywords, such as, but not limited to, identifying a stream of numbers that may represent a mobile number, extracting keywords related to personality, job, likes, dislikes, or the like, in the historical data 306. In another example, the data filtration and normalization module 214 may be configured to extract one or more named entities which are related to specific objects or actions (for example, identifying full name of an institution by recognizing informal name of the institution in a post) from the historical data 306 and recognize one or more activities which are mentioned indirectly (for example, recognizing a type of sport activity by referring a place description or a club name in a post) in the historical data 306.

Processing of the test data 302 may further involve analyzing the voice data 304. For analyzing the voice data 304, the feature extraction module 218 may be configured to perform audio processing (as represented by block 312) followed by feature value extraction (represented by block 314). In one scenario, the application server 106 may use the date and time markers of the voice sample for audio processing and feature value extraction. In other words, the application server 106 may be configured to perform audio processing and feature value extraction in a chronological order based on the date and time markers. For example, the application server 106 may process a voice sample that was obtained one month ago before another voice sample that was obtained one day ago. The feature values are extracted for voice features, such as, paralinguistic features, linguistic features, sound features, or the like (as represented by block 316). In one embodiment, the extracted feature values may correspond to a multidimension vector. In one embodiment, the feature extraction module 218 may be configured to combine the extracted feature values corresponding to the voice samples of the voice data 304. For example, the feature extraction module 218 may normalize and adjust the extracted feature values corresponding to the voice samples of each test user 102 to obtain a specific set of feature values for each test user 102. The feature extraction module 218 may be configured to store the extracted feature values corresponding to the voice data 304 in the database server 108.

Processing of the test data 302 may further involve analyzing the answers 308 to derive psychometric features of the test users 102. For the sake of ongoing description, the psychometric features are assumed to include personality and mood attributes, such as, but not limited to, neuroticism, openness, conscientiousness, extraversion, amused, cheerfulness, realistic, investigative, artistic, social, enterprising, and conventional (as represented by block 318). The first processor 202 may be configured to analyze the answers 308 corresponding to each test user 102 for deriving the personality and mood attributes (i.e., the psychometric features) of each test user 102. When the first processor 202 receives the answers 308, the first processor 202 may be configured to determine the psychometric score for the test user 102a. In one example, when the answers 308 provided by the test user 102a include a score selected by the test user 102a from the linear scale associated with each psychometric question, the psychometric score may be equal to a cumulative sum of the scores selected by the test user 102a. In another example, when the answers 308 provided by the test user 102a include one or more options selected by the test user 102a from the set of options associated with each psychometric question, the psychometric score may be equal to a cumulative sum of the scores associated with the options selected by the test user 102a. For deriving the personality and mood attributes 318 of the test user 102a, the first processor 202 may be configured to determine the confidence score for each personality and mood attribute 318 based on the determined psychometric score of the test user 102a. It will be apparent to a person of skill in the art that the abovementioned exemplary scenario is for illustrative purpose and should not be construed to limit the scope of the disclosure. The first processor 202 may derive the personality and mood attributes 318 from the answers 308 by using by any technique known in the art.

After the test data 302 is processed, the model generator 212 may be configured to use the analyzed historical data, the extracted feature values, the combined feature values extracted from the voice data 304, and the derived psychometric features as inputs for predictor model generation (as represented by block 320). The model generator 212 may be configured to use one or more machine learning algorithms, such as regression based predictive learning, neural networks based predictive leaning, and the like, for generating predictor models 322. During the generation of the predictor models 322, the model generator 212 may be configured to map the voice features and analyzed historical data with the derived personality and mood attributes based on the extracted feature values and generate links therebetween. In other words, a linear combination of voice features is linked to each personality and mood attribute based on the extracted feature values. For example, in a linear regression model, for a first set of feature values extracted from the voice samples of the test user 102a, the voice features may be mapped to the confidence scores of each of the personality and mood attributes 318 derived for the test user 102a. For a second set of feature values extracted from the voice samples of the test user 102b, the voice features may be mapped to the confidence scores of each of the personality and mood attributes 318 derived for the test user 102b. Likewise, the analyzed historical data may be mapped with the personality and mood attributes 318. The model generator 212 may be configured to assign weights to the generated links. The assigned weights indicate the strength of association between the specific voice feature and the personality and mood attributes 318. For example, the model generator 212 may assign a first set of weights to a first set of links between the voice features and the personality and mood attributes 318 derived for the test user 102a. In one scenario, when the second set of feature values extracted from the voice samples of the test user 102b are same as the first set of feature values and the confidence scores of the personality and mood attributes 318 derived for the test user 102b are same as of the user 102a, the model generator 212 may be configured to increase the first set of weights assigned to the first set of links. However, if the second set of feature values are different from the first set of feature values and/or the confidence scores of the personality and mood attributes 318 derived for the test user 102b are not same as of the user 102a, the model generator 212 may be configured to adjust the first set of weights assigned to the first set of links and may generate a second set of links having a second set of weights between the voice features and the personality and mood attributes 318 derived for the test user 102b. Similarly, the model generator 212 may assign weights to the links generated between the voice features and the personality and mood attributes 318 derived for other test users 102c-102n. The model generator 212 may be configured to generate the predictor models 322 by using the weighted links. It will be apparent to a person of ordinary skill in the art that the abovementioned examples are for illustrative purpose, the model generator 212 may use other complex models of mapping the voice features to the personality and mood attributes 318 without deviating from the scope of the disclosure.

The predictor models 322 generated by the model generator 212 may include at least three predictor models. The first predictor model may be capable of predicting psychometric features (such as the personality and mood attributes) by using feature values extracted from a voice sample as input. The second predictor model may be capable of predicting psychometric features (such as the personality and mood attributes) by using analyzed historical data as input. The third predictor model may be capable of predicting business outcomes by using predicted and derived psychometric features (such as the predicted and derived personality and mood attributes) and feature values extracted from one or more voice samples as input. The model generator 212 may be further configured to store the three predictor models 322 in the database server 108. The predictor models 322 may be used by the prediction module 216 for predicting business outcomes described in conjunction with FIGS. 4-7.

It will be apparent to a person of ordinary skill in the art that the voice features (as represented by block 316) and the personality and mood attributes (as represented by block 318) are shown for illustrative purpose. Thus, the voice features can include any voice feature known in the art and the personality and mood attributes may include any attribute known in the art, without deviating from the scope of the disclosure.

Figure 4:
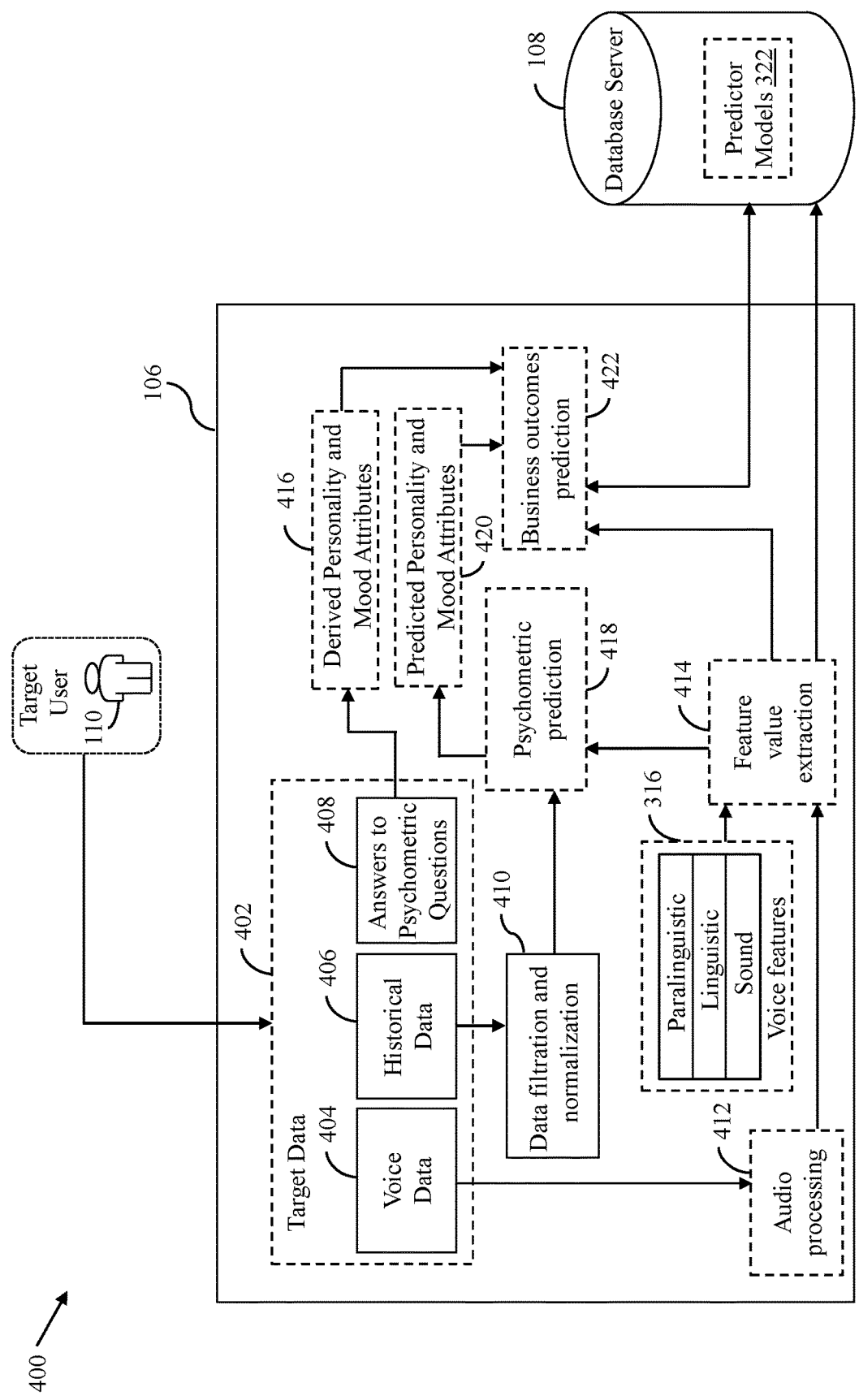
FIG. 4 is a block diagram that illustrates an exemplary scenario for predicting business outcomes, in accordance with an exemplary embodiment of the disclosure.

FIG. 4 is a block diagram that illustrates an exemplary scenario 400 for predicting business outcomes, in accordance with an exemplary embodiment of the disclosure. The exemplary scenario 400 involves the target user 110 who may provide target data 402, the application server 106, and the database server 108 that may store the predictor models 322. The exemplary scenario 400 illustrates a scenario where the target data 402 includes voice data 404 of the target user 110, historical data 406 of the target user 110, and answers 408 provided by the target user 110 to the psychometric questions.

For retrieving the voice data 404 of the target user 110, the application server 106 may be configured to utilize the software application running on the target-user device 112 for retrieving, with the consent of the target user 110, the voice recordings stored in the target-user device 112. The application server 106 may be configured to utilize the software application running on the target-user device 112 for retrieving the voice recordings uploaded or posted by the target user 110 on the social media profile. In another scenario, the application server 106 may be configured to prompt the target user 110, through the software application running on the target-user device 112, to record and upload the test user's 102 voice sample in real time for providing to the application server 106. The voice data 404 may further include corresponding date and time markers of the voice samples.

The historical data 406 of the target user 110 may include, but is not limited to, the curriculum information, the education particulars, the travel history, the employment details, and the purchase history of the target user 110. For example, the target-user device 112, executing the software application hosted by the application server 106, may be configured to access the activity log of the target user 110 on the internet and social media platforms to obtain the travel history and the purchase history of the target user 110. Based on a consent of the target user 110, the target-user device 112 may be further configured to access the social media profile (for example LinkedIn®, Facebook®, or the like) of the target user 110 for obtaining the education and job particulars of the target user 110 and one or more posts that are shared, liked, or followed by the target user 110 on the social media profile. The application server 106 may be further configured to communicate a questionnaire to the target user 110, regarding the historical data 406 of the target user 110 through the software application accessed by the target user 110 on the target-user device 112. The target-user device 112 may be configured to communicate to the application server 106 a response provided by the target user 110 to the questionnaire and the application server 106 may be configured to the include the response of the target user 110 in the historical data 406.

The application server 106 may be further configured to prompt the target user 110 through the software application that runs on the target-user device 112 to take one or more online tests (such as, but not limited to, the multiple intelligence quiz, the BIG 5, or the personal globe inventory) that include the psychometric questions. The answers 408 to the psychometric questions are then provided by the target user 110. In another embodiment, the application server 106 may be configured to retrieve the answers 408 from the third-party servers that conduct the psychometric analysis of users via online tests.

After retrieving the target data 402, the application server 106 may be configured to process the target data 402. Processing of the target data 402 may involve filtering and normalizing the historical data 406 (as represented by block 410). Processing of the target data 402 may further involve analyzing the voice data 404. For analyzing the voice data 404, the feature extraction module 218 may be configured to perform audio processing (as represented by block 412) followed by feature value extraction (as represented by block 414) on the voice data 404. During feature value extraction, the feature extraction module 218 may be configured to extract the feature values corresponding to the voice features (as represented by block 316). The voice features may include, but are not limited to, paralinguistic features, linguistic features, and sound features. The feature extraction module 218 may be configured to store the extracted feature values corresponding to the voice data 404 in the database server 108. Processing of the target data 402 may further involve analyzing the answers 408 by the first processor 202 for deriving personality and mood attributes 416 (hereinafter, referred to as "derived personality and mood attributes 416") of the target user 110.

After the target data 402 is processed, the prediction module 216 may be configured to query the database server 108 to retrieve the predictor models 322. The prediction module 216 may be configured to use the feature values extracted from the voice data 404 and the analyzed historical data as input to the first and second predictor models, respectively, for psychometric prediction (as represented by block 418). The psychometric prediction may yield predicted personality and mood attributes 420 of the target user 110 as output. In one embodiment, the prediction module 216 may be configured to predict personality and mood attributes separately for each voice sample of the voice data 404 by using the first predictor model. After the personality and mood attributes are predicted for each voice sample of the voice data 404, the prediction module 216 may be configured to normalize and adjust the personality and mood attributes to yield the predicted personality and mood attributes 420. In another embodiment, the prediction module 216 may be configured to normalize and combine the feature values extracted from the voice samples of the voice data 404 and use the normalized and combined feature values as input to the first predictor model for obtaining the predicted personality and mood attributes 420. In another example, the prediction module 216 may be configured to predict the personality and mood attributes 420 by using the first predictor model in two stages. The first stage may include predicting the mood attributes by using the normalized and combined feature values extracted from the voice samples of the voice data 404 as input to the first predictor model and the second stage may include predicting the personality attributes by using the predicted mood attributes as input.

The prediction module 216 may be further configured to use the combined feature values extracted from the voice data 404, the derived personality and mood attributes 416, and the predicted personality and mood attributes 420 as input to the third predictor model for predicting business outcomes (as represented by block 422). The application server 106 may be configured to store the predicted business outcomes in the database server 108. In an embodiment, the business outcomes may include, but are not limited to, job suggestions, purchase suggestions, targeted advertisements, compatibility match, and the like. In one embodiment, due to chronological processing of the voice data 404 based on the date and time markers, the application server 106 may be capable of predicting the business outcomes as per behavioral changes exhibited by the target user 110 over a period of time. The application server 106 may be configured to communicate the predicted business outcomes to the target user 110. Thus, based on the predicted business outcomes, intelligent and informed decisions (such as accepting or denying a job offer, and the like) may be made by the target user 110. In another embodiment, the business outcomes may include purchase trend of various commodities, affinity of the target user 110 for one or more activities, and the like. The application server 106 may communicate the predicted business outcomes to an organization, such as a social media provider, an e-commerce provider, or the like. Thus, based on the predicted business outcomes, intelligent and informed decisions (such as providing relevant job suggestions to the target user 110 on the social media profile of the target user 110 or customizing the social media profile of the target user 110 based on the interests of the target user 110) may be made by the social media provider. Likewise, based on the predicted business outcomes, an e-commerce platform may make intelligent decisions, such as updating their inventory based on the purchase trend. The e-commerce platform may divide customers into different groups based on their common purchase interests (i.e., business outcomes). Moreover, deep personalization of a customer (i.e., analyzing voice samples of the customer) to understand more complex patterns of customer behavior (i.e., business outcomes) and preferences may help the e-commerce platform to grow.

In an exemplary scenario, the application server 106 may be implemented by a customer helpdesk of an organization. Thus, when the target user 110 places a call to the customer helpdesk for a query, conversation between the target user 110 and a customer helpdesk executive may be monitored and analyzed for predicting business outcomes for the target user 110. The customer helpdesk executive may use the predicted business outcomes and the personality and mood attributes of the target user 110 to provide relevant insights to the target user 110, thereby achieving high customer satisfaction.

In another exemplary scenario, the target user 110 may be a person to be hired by an organization. In this scenario, voice samples of the target user 110 may be obtained and analyzed by using the predictor models 322 to get accurate prediction of the personality and mood of the target user 110, without asking any question to the target user 110. In another exemplary scenario, the target user 110 may be an employee of the organization, whose employment affinity (i.e., a business outcome) is of interest to the organization, such as for employee retention and engagement. In another exemplary scenario, the disclosure may be implemented to achieve emotional intelligence within robots, i.e., improving working efficiency with which robots learn emotional attributes.

It will be understood by a person of ordinary skill in the art that the abovementioned business outcomes are listed for exemplary purpose and should not be construed to limit the scope of the disclosure. In other embodiments, the predictor models 322 may be utilized to predict business outcomes that are different from the business outcomes mentioned above.

In one embodiment, the application server 106 may be configured to render a user interface (UI) on the target-user device 112 for presenting the predicted business outcomes to the target user 110. In one example, the application server 106 may render the UI through the software application that runs on the target-user device 112. A feedback (for example, a common score or an individual score for each business outcome) may be provided by the target user 110 to indicate a relevance of the predicted business outcomes. For example, when the business outcomes have high relevance to the target user 110, a positive feedback may be provided by the target user 110. In another example, when the business outcomes have low relevance to the target user 110, a negative feedback may be provided by the target user 110. The model generator 212 may use the feedback provided by the target user 110 to update the predictor models 322 for improving the prediction accuracy. The model generator 212 may be configured to adjust the weight of links between the voice features and the personality and mood attributes based on the feedback.

Figure 5:
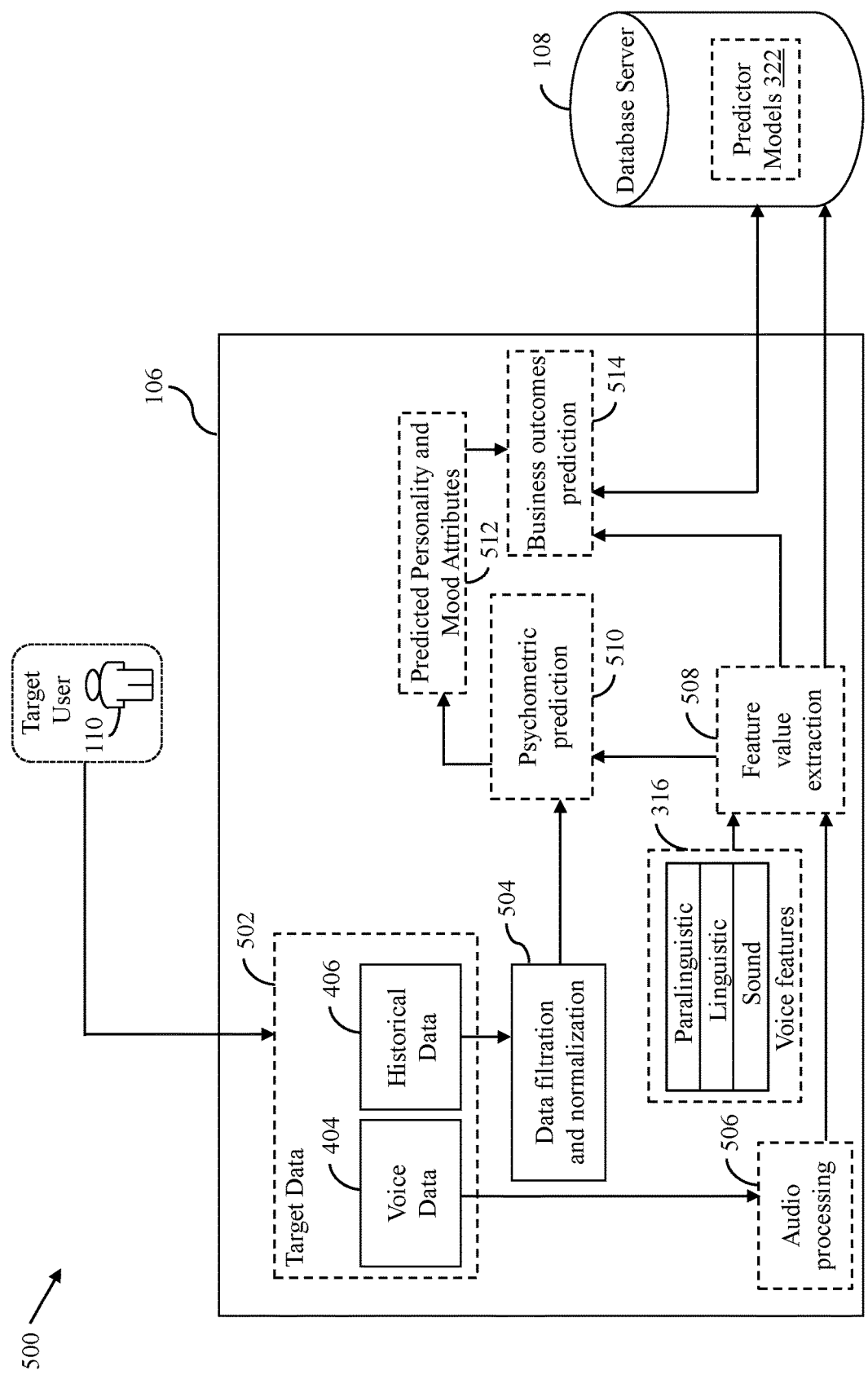
FIG. 5 is a block diagram that illustrates another exemplary scenario for predicting business outcomes, in accordance with another exemplary embodiment of the disclosure.

FIG. 5 is a block diagram that illustrates an exemplary scenario 500 for predicting business outcomes, in accordance with another embodiment of the disclosure. The exemplary scenario 500 involves the target user 110 who may provide target data 502, the application server 106, and the database server 108 that may store the predictor models 322. The exemplary scenario 500 illustrates a scenario where the target data 502 includes the voice data 404 of the target user 110 and the historical data 406 of the target user 110. The application server 106 may be configured to retrieve the target data 502 in a manner similar to the retrieval of the target data 402 as explained in FIG. 4.

After retrieving the target data 502, the application server 106 may be configured to process the target data 502. Processing of the target data 502 may involve filtering and normalizing the historical data 406 (as represented by block 504). Processing of the target data 502 may further involve analyzing the voice data 404. The feature extraction module 218 may be configured to analyze the voice data 404 by performing audio processing (as represented by block 506) followed by feature value extraction (as represented by block 508). During feature value extraction, the feature extraction module 218 may be configured to extract the feature values corresponding to the voice features (as represented by block 316). The voice features may include, but are not limited to, paralinguistic features, linguistic features, and sound features. The feature extraction module 218 may be configured to store the extracted feature values corresponding to the voice data 404 in the database server 108. Since the target data 502 does not include answers to psychometric questions, the first processor 202 does not derive any personality and mood attributes of the target user 110.

After the target data 502 is processed, the prediction module 216 may be configured to query the database server 108 to retrieve the predictor models 322. The prediction module 216 may be configured to use the feature values extracted from the voice data 404 and the analyzed historical data as input to the first and second predictor models, respectively, for psychometric prediction (as represented by block 510). The psychometric prediction may yield predicted personality and mood attributes 512 of the target user 110 as output.

The prediction module 216 may be further configured to use the feature values extracted from the voice data 404 and the predicted personality and mood attributes 512 as input to the third predictor model for predicting the business outcomes (as represented by block 514). The predicted business outcomes may be relevant to the target user 110 and/or an organization as described in FIG. 4. The application server 106 may be configured to store the predicted business outcomes in the database server 108.

Figure 6:
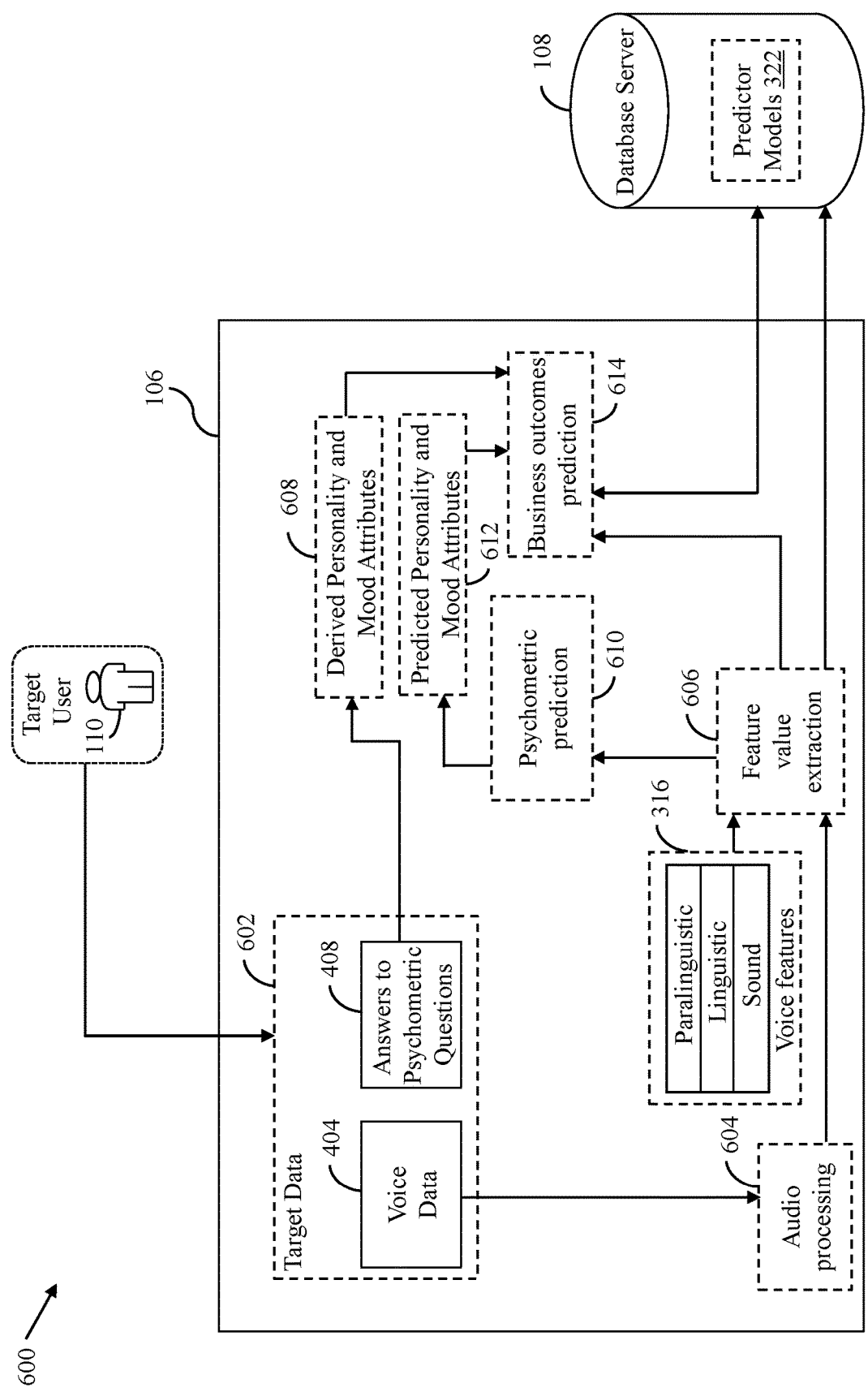
FIG. 6 is a block diagram that illustrates another exemplary scenario for predicting business outcomes, in accordance with another exemplary embodiment of the disclosure.

FIG. 6 is a block diagram that illustrates an exemplary scenario 600 for predicting business outcomes, in accordance with another embodiment of the disclosure. The exemplary scenario 600 involves the target user 110 who provides target data 602, the application server 106, and the database server 108 that stores the predictor models 322. The exemplary scenario 600 illustrates a scenario where the target data 602 includes the voice data 404 of the target user 110 and the answers 408 provided by the target user 110 to the psychometric questions. The application server 106 may be configured to retrieve the target data 602 in a manner similar to the retrieval of the target data 402 as explained in FIG. 4.

After retrieving the target data 602, the application server 106 may be configured to process the target data 602. Processing of the target data 602 may involves analyzing the voice data 404. The feature extraction module 218 may be configured to perform audio processing (as represented by block 604) followed by feature value extraction (as represented by block 606). During feature value extraction, the feature extraction module 218 may be configured to extract the feature values corresponding to the voice features (as represented by block 316). The voice features may include, but are not limited to, paralinguistic features, linguistic features, and sound features. The feature extraction module 218 may be configured to store the extracted feature values corresponding to the voice data 404 in the database server 108. Processing of the target data 602 may further involve analyzing the answers 408 by the first processor 202 for deriving personality and mood attributes 608 (hereinafter, referred to as "derived personality and mood attributes 608") of the target user 110.

After the target data 602 is processed, the prediction module 216 may be configured to query the database server 108 to retrieve the predictor models 322. The prediction module 216 may be configured to use the feature values extracted from the voice data 404 as input to the first predictor model for psychometric prediction (as represented by block 610). The psychometric prediction may yield predicted personality and mood attributes 612 as output.

The prediction module 216 may be further configured to use the feature values extracted from the voice data 404, the derived personality and mood attributes 608, and the predicted personality and mood attributes 612 as input to the third predictor model for predicting the business outcomes (as represented by block 614). The predicted business outcomes may be relevant to the target user 110 and/or an organization as described in FIG. 4. The application server 106 may be configured to store the predicted business outcomes in the database server 108.

Figure 7:
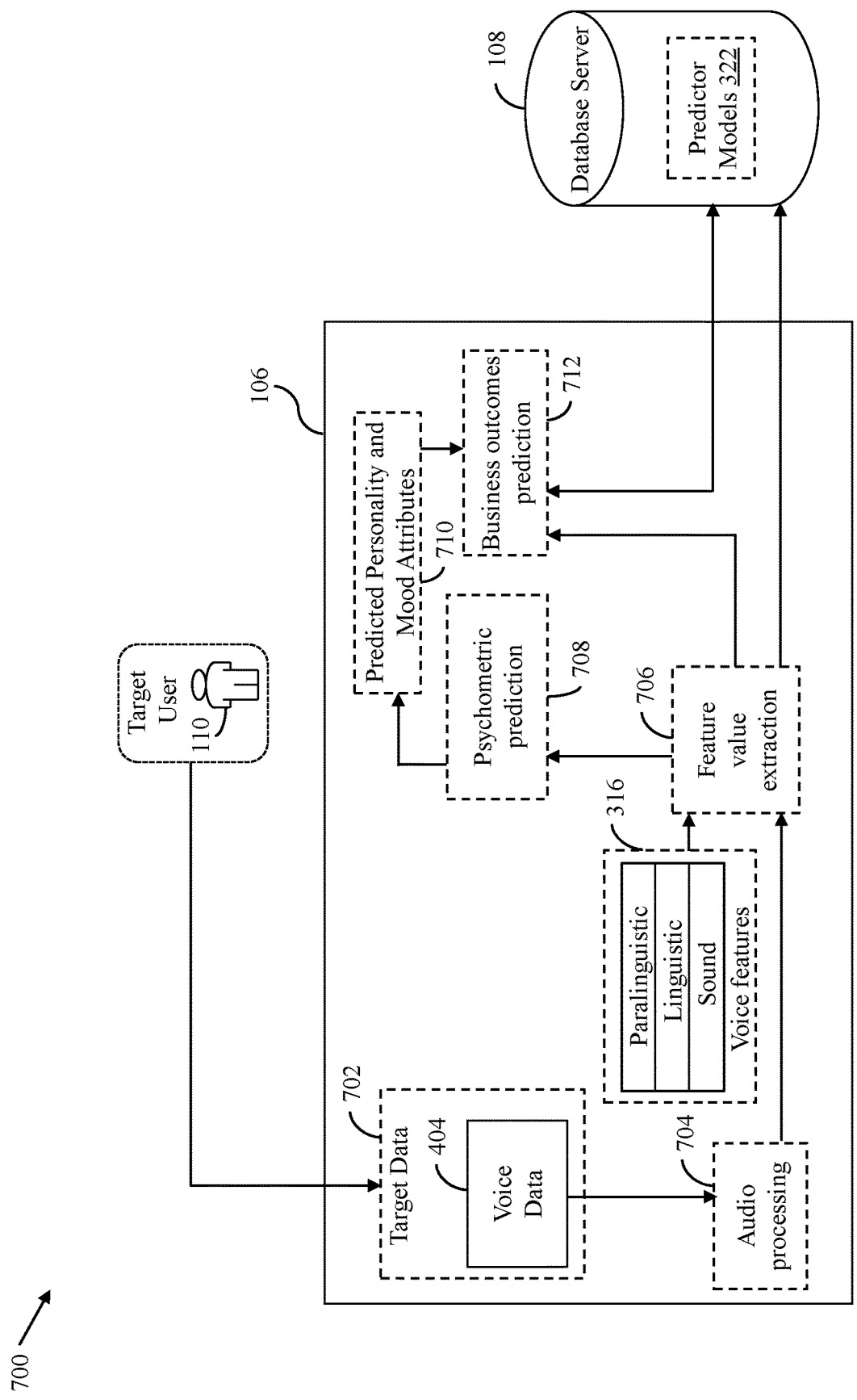
FIG. 7 is a block diagram that illustrates another exemplary scenario for predicting business outcomes, in accordance with another exemplary embodiment of the disclosure.

FIG. 7 is a block diagram that illustrates an exemplary scenario 700 for predicting business outcomes, in accordance with an embodiment of the disclosure. The exemplary scenario 700 involves the target user 110 who may provide target data 702, the application server 106, and the database server 108 that stores the predictor models 322. The exemplary scenario 700 illustrates a scenario where the target data 702 includes only the voice data 404 of the target user 110. The application server 106 may be configured to retrieve the target data 702 in a manner similar to the retrieval of the target data 402 as explained in FIG. 4.

After retrieving the target data 702, the application server 106 may be configured to process the target data 702. Processing of the target data 702 may involve analyzing the voice data 404. The feature extraction module 218 may be configured to perform audio processing (as represented by block 704) followed by feature value extraction (as represented by block 706). During feature value extraction, the feature extraction module 218 may be configured to extract the feature values corresponding to the voice features (as represented by block 316). The voice features may include, but are not limited to, paralinguistic features, linguistic features, and sound features (as represented by block 316). The feature extraction module 218 may be configured to store the extracted feature values corresponding to the voice data 404 in the database server 108. Since the target data 702 does not include answers to psychometric questions, the first processor 202 does not derive any personality and mood attributes of the target user 110.

After the target data 702 is processed, the prediction module 216 may be configured to query the database server 108 to retrieve the predictor models 322. The prediction module 216 may be configured to use the feature values extracted from the voice data 404 as input to the first predictor model for psychometric prediction (as represented by block 708). The psychometric prediction may yield predicted personality and mood attributes 710 as output. The prediction module 216 may be further configured to use the feature values extracted from the voice data 404 and the predicted personality and mood attributes 710 as input to the third predictor model for predicting the business outcomes (as represented by block 712). The predicted business outcomes may be relevant to the target user 110 and/or an organization as described in FIG. 4. The application server 106 may be configured to store the predicted business outcomes in the database server 108.

Figure 8A:
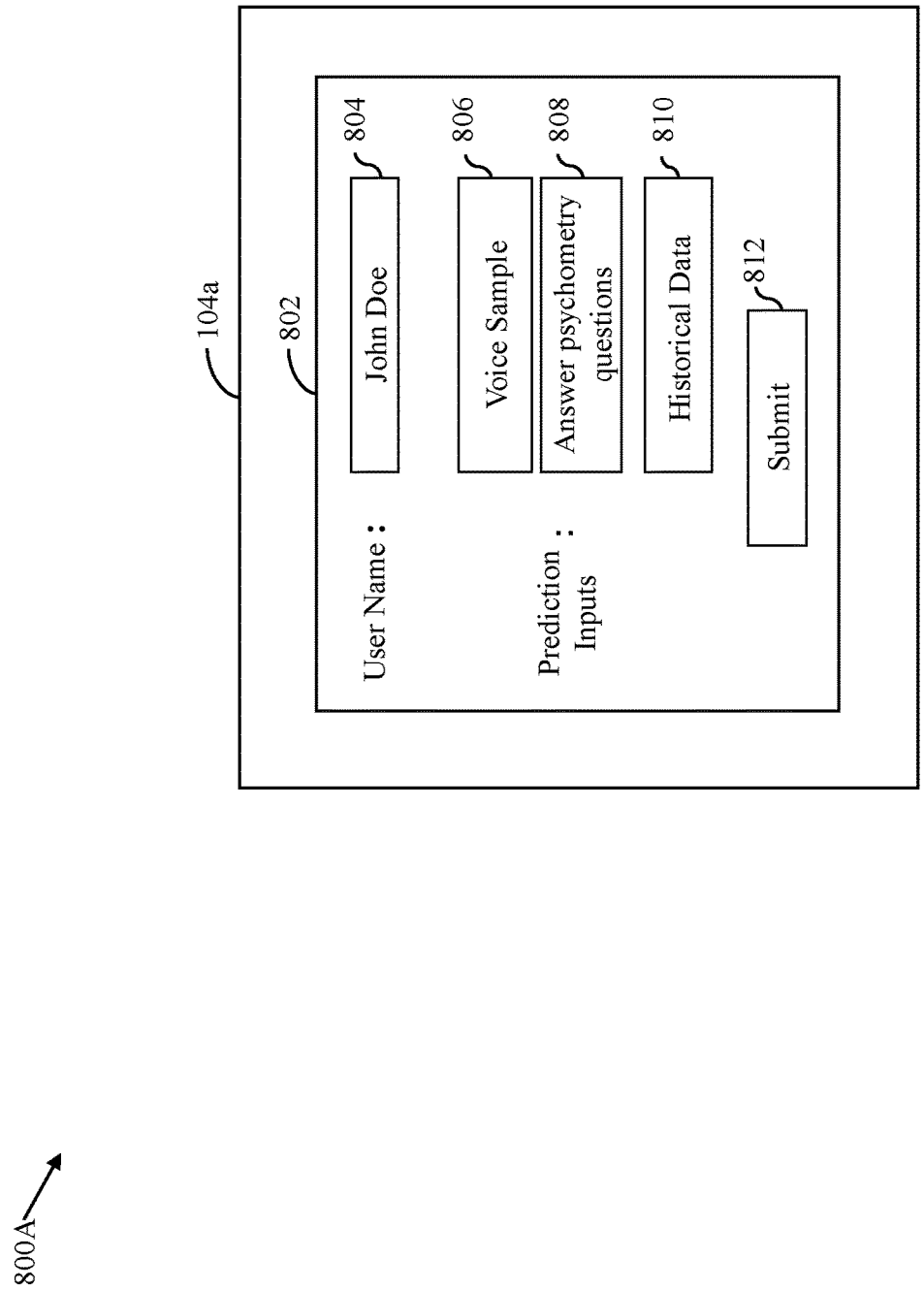
FIG. 8A is a block diagram that illustrates a user interface (UI) rendered on a test-user device by the application server for receiving test data of a test user, in accordance with an embodiment of the disclosure.

FIG. 8A is block diagram 800A that illustrates a UI 802 rendered on the test-user device 104a by the application server 106 for receiving the test data 302 of the test user 102a, in accordance with an embodiment of the disclosure. The UI 802 may include a first input box 804, where a name (for example, "John Doe") is required to be entered by the test user 102a. The UI 802 may further include first through third options 806-810 pertaining to prediction inputs (i.e., the test data 302) required from the test user 102a. The first through third options 806-810 may be selectable by the test user 102a. If the first option 806 is selected by the test user 102a, the application server 106 may be configured to retrieve the voice data 304 of the test user 102a. If the second option 808 is selected by the test user 102a, the application server 106 may be configured to retrieve the answers provided by the test user 102a to the psychometric questions. If the third option 810 is selected by the test user 102a, the application server 106 may be configured to retrieve the historical data of the test user 102a. The retrieval of the voice data 304 of the test user 102a, the answers provided by the test user 102a to the psychometric questions, and the historical data 306 has been described in FIG. 3. The UI 802 may further include a submit button 812, which may be selected by the test user 102a to submit the test data 302 to the application server 106.

It will be apparent to a person of ordinary skill in the art that the UI 802 is shown for illustrative purposes and should not be construed to limit the scope of the disclosure. In another embodiment, the application server 106 may render the UI 802 on the target-user device 112 for retrieving the target data (such as the target data 402, 502, 602, or 702) of the target user 110. The application server 106 may be configured to retrieve the target data (as described in FIGS. 4-7) based on the selection performed by the target user 110. For example, if the second option 808 is not selected and the third option 810 is selected by the target user 110, the application server 106 may retrieve only the voice data 404 and the historical data of the target user 110.

Figure 8B:
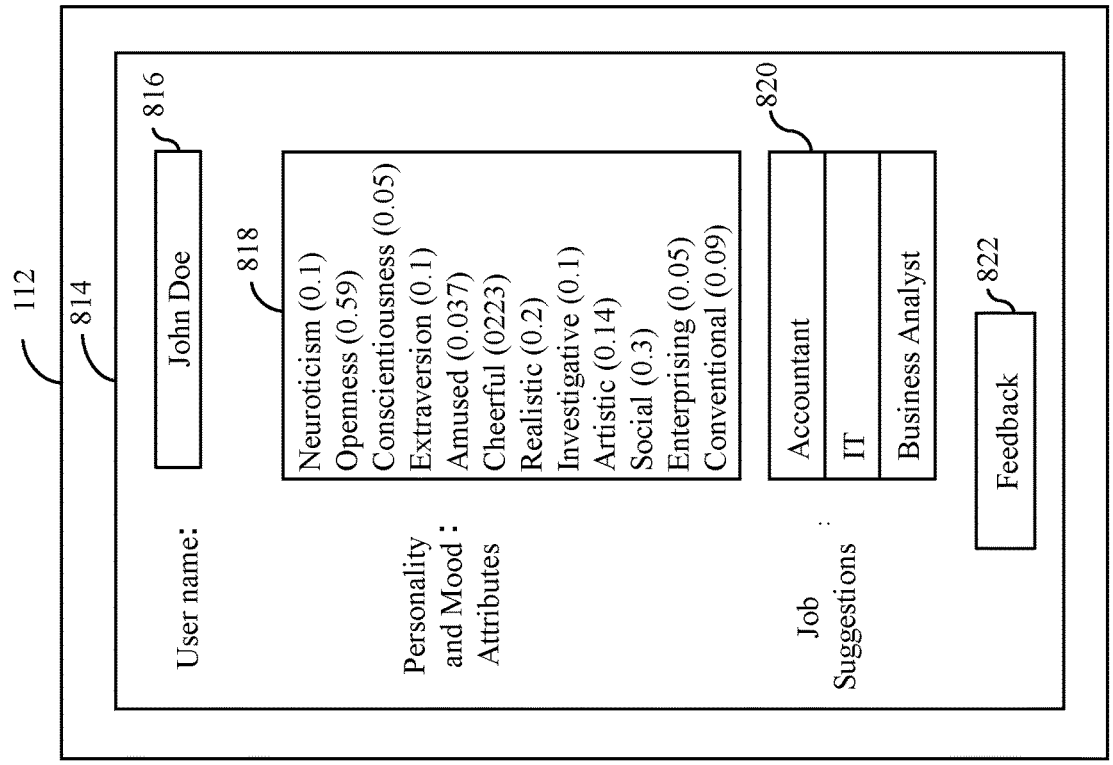
FIG. 8B is a block diagram that illustrates a UI rendered on a target-user device by the application server for presenting predicted business outcomes, in accordance with an embodiment of the disclosure.

FIG. 8B is a block diagram 800B that illustrates a UI 814 rendered on the target-user device 112 by the application server 106 for presenting predicted business outcomes, in accordance with an embodiment of the disclosure. The UI 814 may include a first field 816, where the name of the target user 110 is displayed (for example, "John Doe"). The UI 814 may further include a first table 818 that may display personality and mood attributes of the target user 110 and corresponding confidence scores. For example, the personality and mood attributes of the target user 110 are neuroticism, openness, conscientiousness, extraversion, amused, cheerful, realistic, investigative, social, enterprising, and conventional having the confidence scores as 0.1, 0.59, 0.05, 0.01, 0.037, 0.223, 0.2, 0.1, 0.14, 0.3, 0.05, and 0.09, respectively. The UI 814 may further include a second table 820 that may display various job suggestions (such as Accountant, IT, and Business analyst) for the target user 110 and corresponding confidence scores. Likewise, the UI 814 may include additional tables (not shown) that display relevant business outcomes, such as product purchase suggestions, travel suggestions, or the like, to the target user 110. The UI 814 further includes a feedback button 822. The target user 110 may select the feedback button 822 for providing a feedback, such as a common score or an individual score per business outcome, to the application server 106 indicating the relevance of the predicted business outcomes displayed in the second table 820.

Figure 9A:
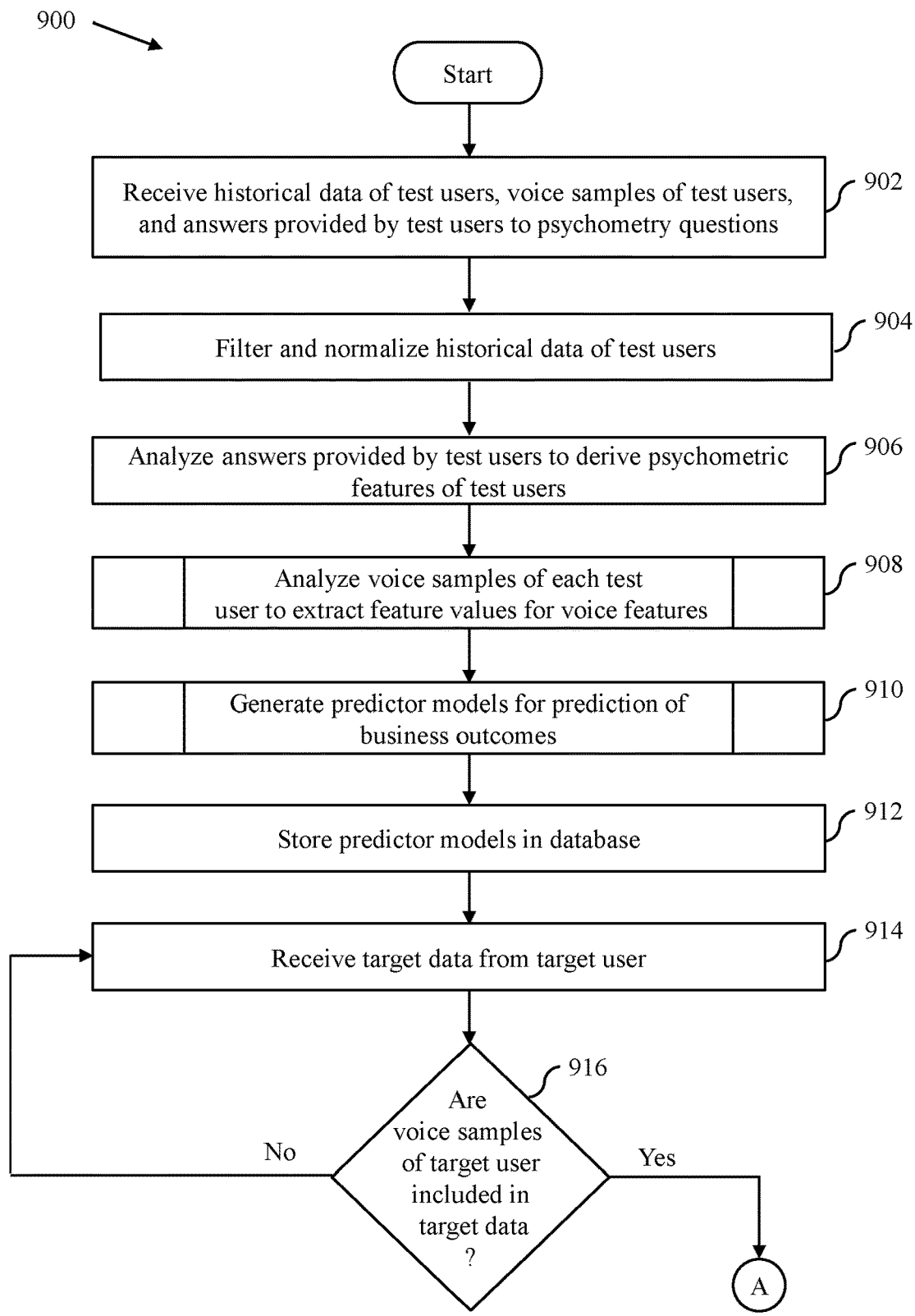
FIGS. 9A-9E, collectively represent a flow chart that illustrates a method for predicting business outcomes, in accordance with an embodiment of the disclosure.
Figure 9B:
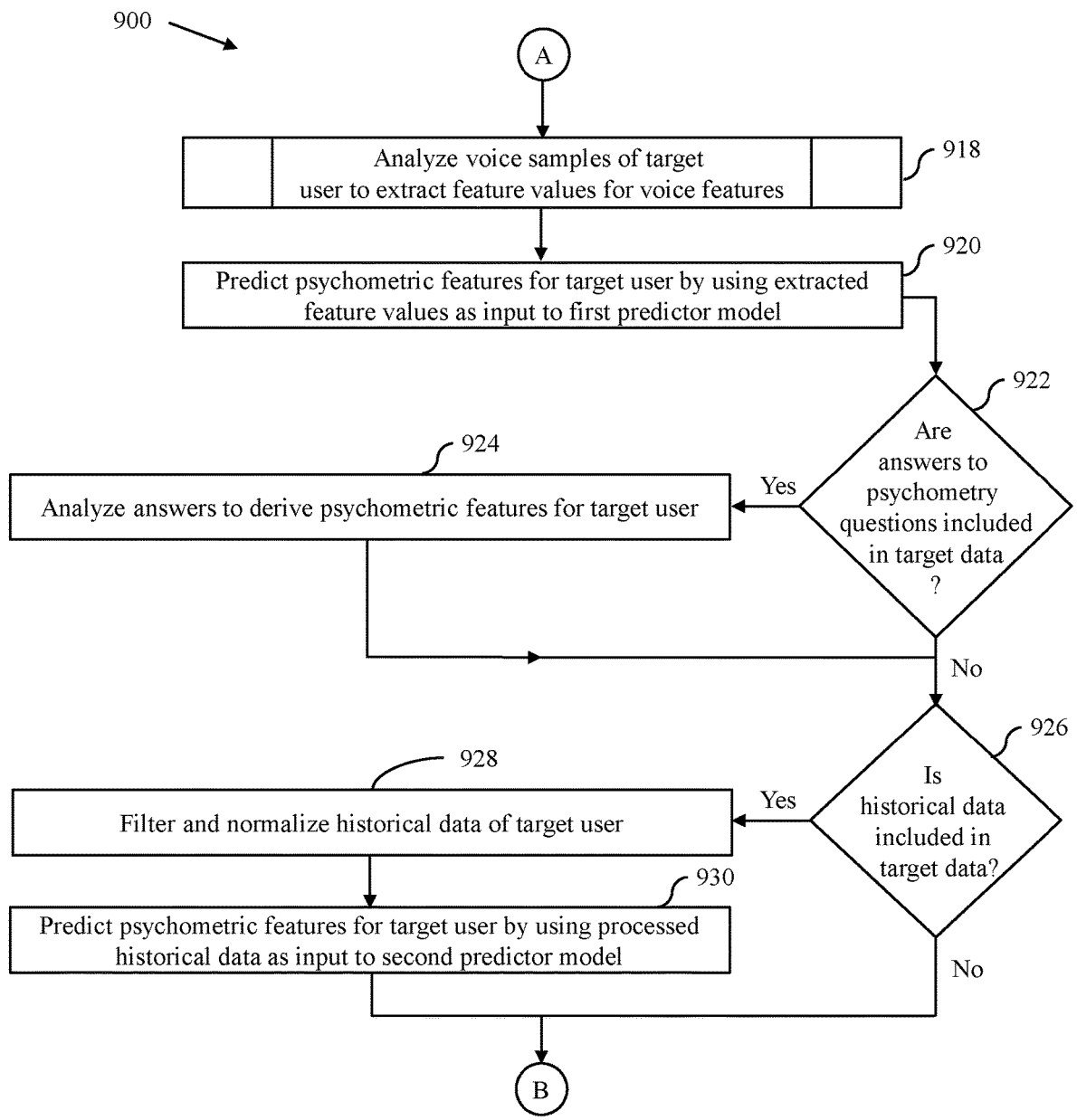
Figure 9C:
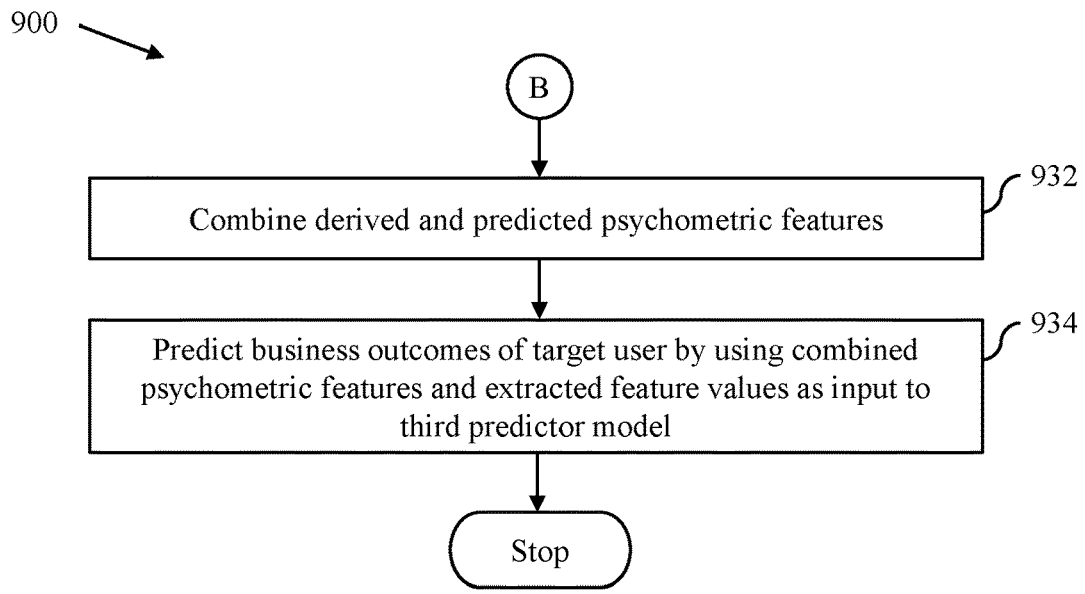

FIGS. 9A-9E, collectively represent a flow chart 900 that illustrates a method for predicting business outcomes, in accordance with an embodiment of the disclosure. With reference to FIGS. 9A-9C, at 902, the historical data 306 of the test users 102, the voice samples (i.e., the voice data 304) associated with the test users 102, and the answers provided by the test users 102 to the psychometric questions (i.e., the test data 302 as described by FIG. 3) are retrieved. The application server 106 may retrieve the historical data 306, the voice samples (i.e., the voice data 304) associated with the test users 102, and the answers 308. At 904, the historical data 306 of the test users 102 is filtered and normalized (as described in FIG. 3). At 906, the answers 308 provided by the test users 102 are analyzed for deriving psychometric features of the test users 102 (as described in FIG. 3). At 908, the voice samples (i.e., the voice data 304) of each test user 102 are analyzed for extracting feature values for the voice features (as represented by block 316 of FIG. 3). The application server 106 may be configured to analyze the voice samples by selecting one item at a time from the voice data 304.

Figure 9D:
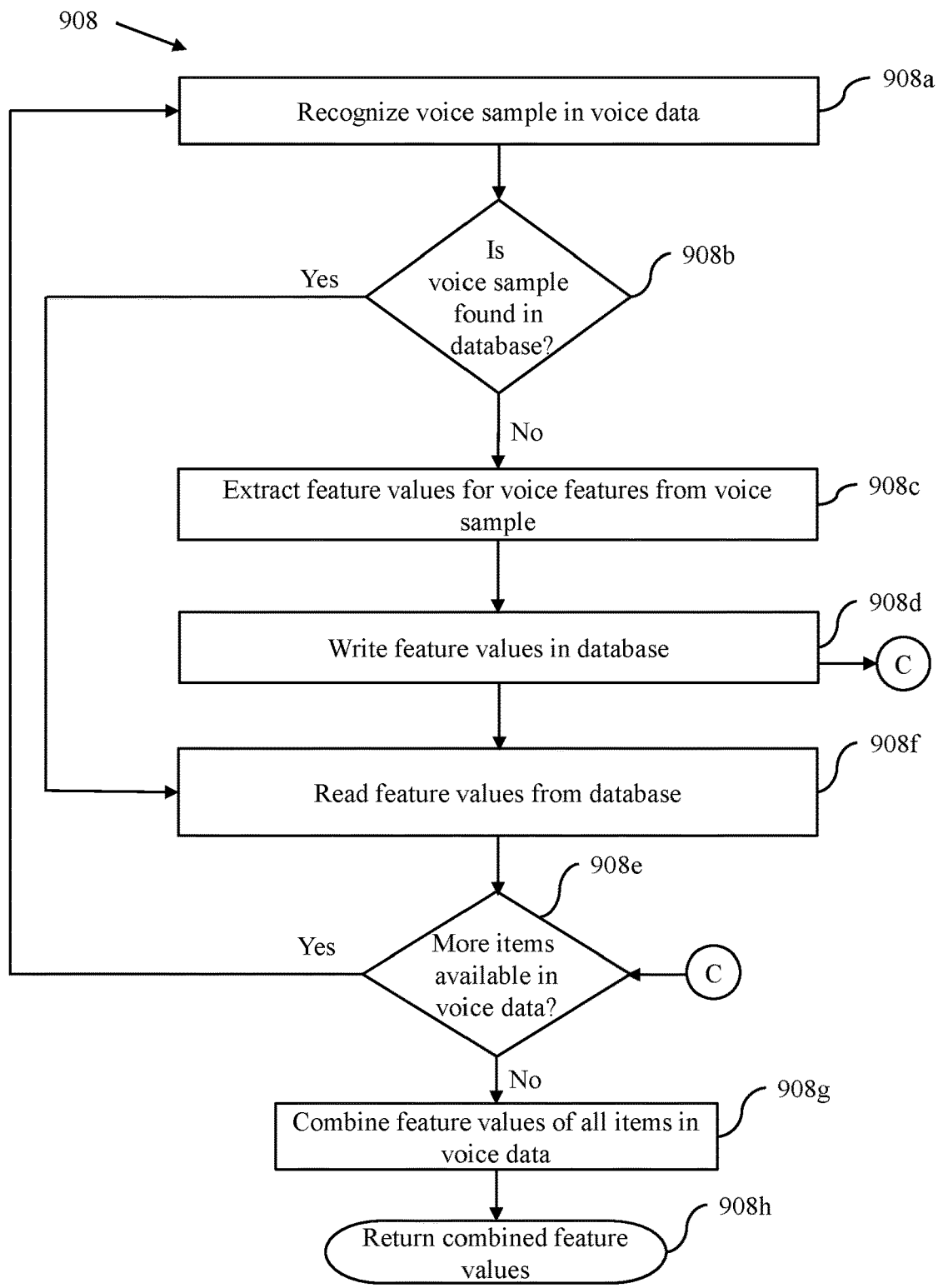

Referring now to FIG. 9D, at 908a, the voice sample is recognized in the voice data 304. At 908b, it is determined whether the voice sample is found in the database server 108. If at 908b, it is determined that the selected voice sample is not present in the database server 108, control passes to 908c. At 908c, the feature values are extracted from the voice sample for the voice features. At 908d, the extracted feature values are written in the database server 108. At 908e, it is determined whether the voice data 304 includes more items. If at 908e, it is determined that the voice data 304 includes one or more items that are not yet processed, control passes to 908a.

If at 908b, it is determined that the voice sample is found in the database server 108, control passes to 908f. At 908f, the stored feature values from the external database server 108 are read. Control passes to 908e. If at 908e, it is determined that all the items of the voice data 304 are analyzed, control passes to 908g. At 908g, the feature values corresponding to all items (voice sample) in the voice data 304 are combined. At 908h, the combined feature values are returned. Control passes to 910.

Referring back to FIGS. 9A-9C, at 910, the predictor models 322 for prediction of business outcomes are generated (as described in FIG. 3). The application server 106 generates the predictor models 322 based on the test data 302 of the test users 102.

Figure 9E:
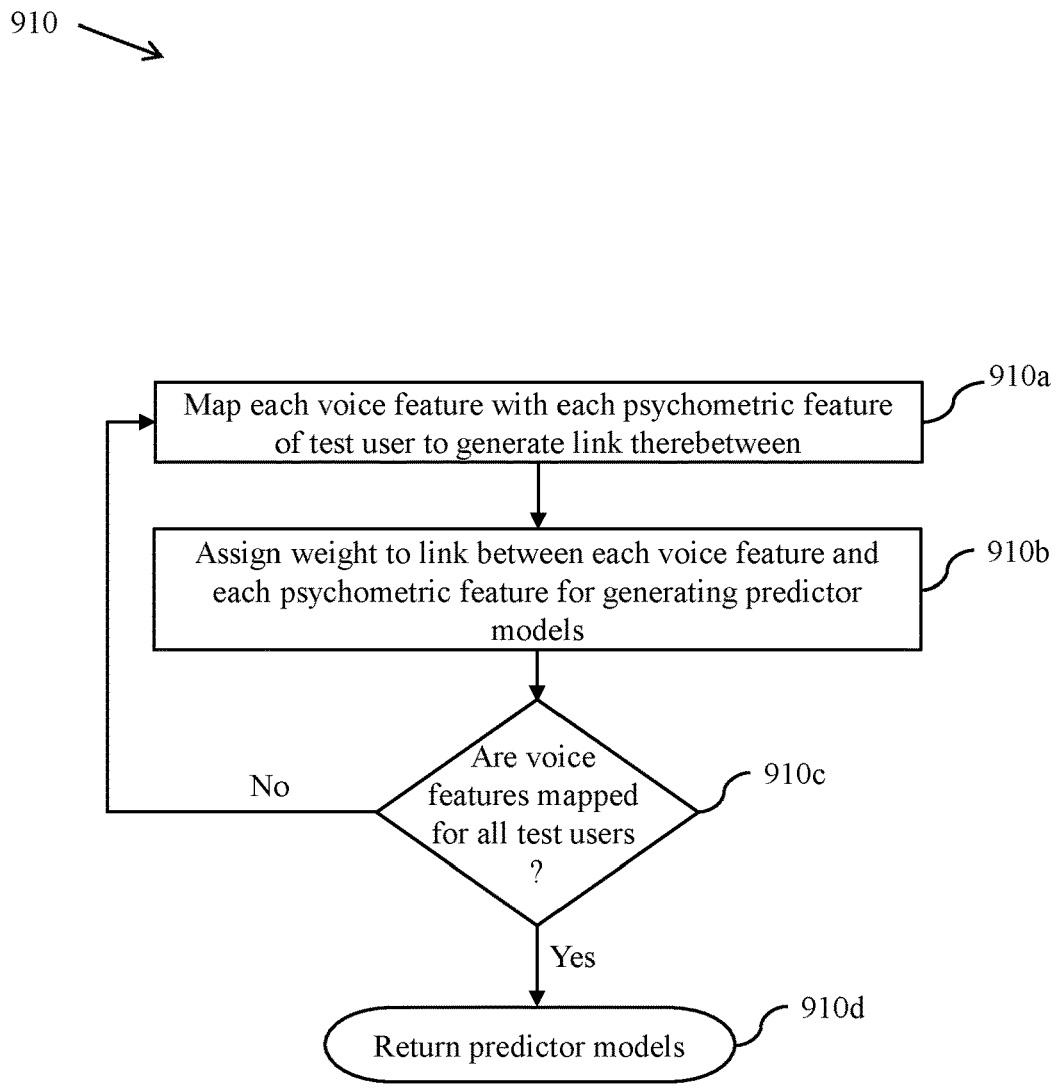

Referring now to FIG. 9E, at 910a, each voice feature is mapped with each psychometric feature of a test user (e.g., any test user 102) to generate link therebetween. The application server 106 may be configured to map each voice feature with a confidence score of each psychometric feature derived for the test user (e.g., any test user 102). At 910b, a weight is assigned to the link between each voice feature and each psychometric feature for generating the predictor models 322. The application server 106 may be configured to assign the weight based on the extracted feature values. At 910c, it is determined whether the voice features are mapped for all the test users 102. If at 910c, it is determined that the voice features are not mapped for all the test users 102, control passes to 910c. The application server 106 may be configured to perform 910a-910c until the voice features are mapped for all the test users 102. If at 910c, it is determined that voice features are mapped for all the test users 102, control passes to 910d. At 910d, the predictor models 322 are returned to the application server 106.

Referring back to FIGS. 9A-9C, at 912, the predictor models 322 are stored in the database server 108. At 914, the target data (such as the target data 402, 502, 602, or 702) is received from the target user 110. At 916, it is determined whether the target data includes voice samples of the target user 110. If at 916, it is determined that the target data does not include the voice samples (i.e., the voice data 404) of the target user 110, control passes to 914. The application server 106 performs 914 again until the voice samples (i.e., the voice data 404) of the target user 110 are received. If at 916, it is determined that the target data includes the voice samples (i.e., the voice data 404) of the target user 110, control passes to 918. At 918, the voice samples (i.e., the voice data 404) of the target user 110 are analyzed to extract feature values for the voice features (as represented by block 316 of FIG. 3). The process of extracting feature values from the voice data 404 is same as that performed for the voice data 304 of the test users 102 comprising 908a-908e of FIG. 9D. At 920, the psychometric features are predicted for the target user 110 by using extracted feature values as input to the first predictor model.

At 922, it is determined whether the target data includes the answers 408 to the psychometric questions. If at 922, it is determined that the target data includes the answers 408, control passes to 924. At 924, the answers 408 are analyzed to derive psychometric features of the target user 110 (as described in FIG. 4). Control passes to 926. If at 922, it is determined that the target data does not include the answers 408, control passes to 926. At 926, it is determined whether the target data includes the historical data 406. If at 926, it is determined that the target data includes the historical data 406, control passes to 928. At 928, the historical data 406 of the target user 110 is filtered and normalized. At 930, the psychometric features are predicted for the target user 110 by using the analyzed historical data 406 as input to the second predictor model. Control passes to 932. If at 926, it is determined that the target data does not include the historical data 406, control passes to 932. At 932, the derived and predicted psychometric features are combined. At 934, the business outcomes for the target user 110 are predicted by using the combined psychometric features and extracted feature values as input to the third predictor model.

Figure 10:
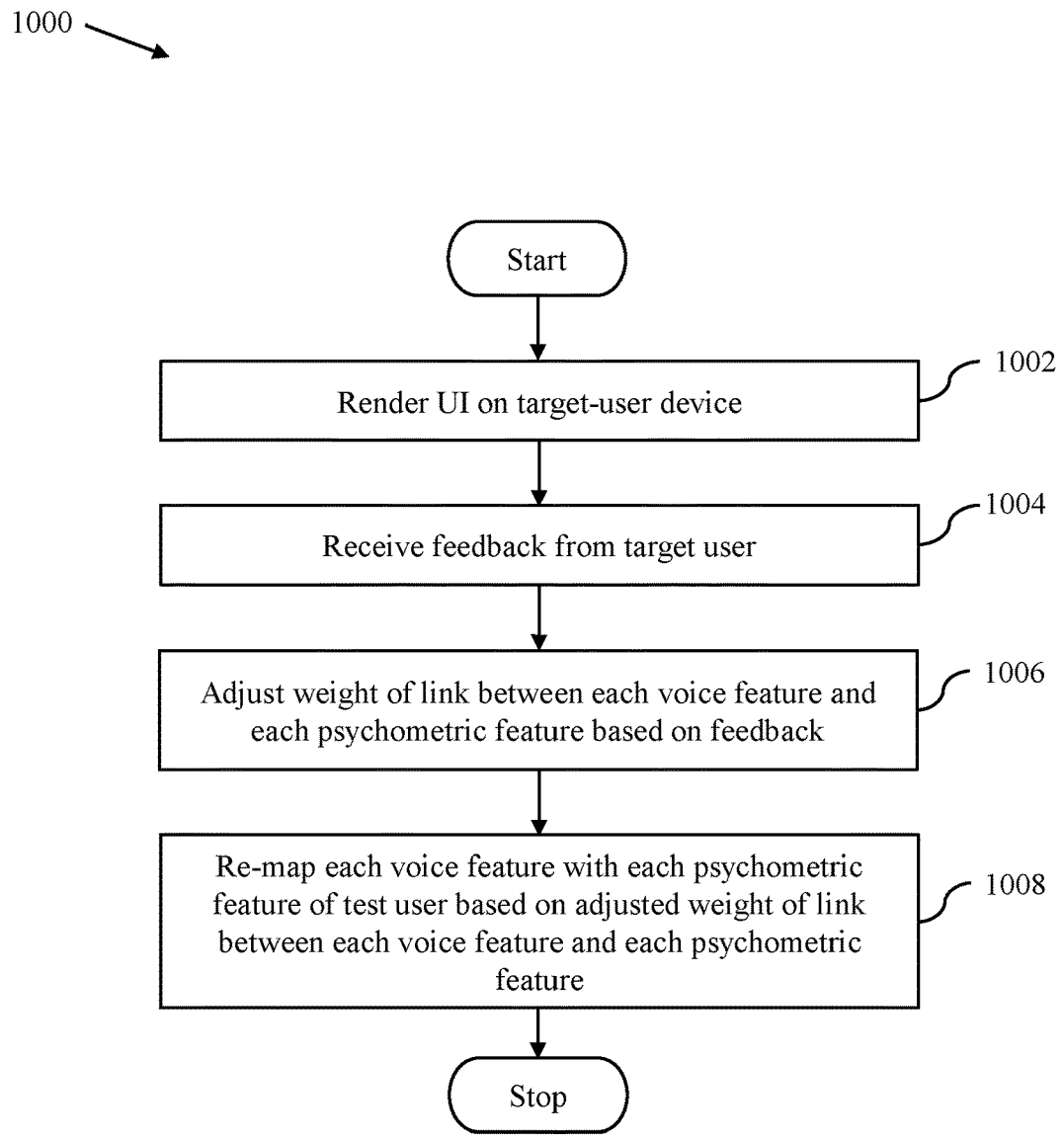
FIG. 10 is a flow chart that illustrates a method for updating the predictor models, in accordance with an embodiment of the disclosure.

FIG. 10 is a flow chart 1000 that illustrates a method for updating the predictor models 322, in accordance with an embodiment of the disclosure. At 1002, the UI 814 is rendered on the target-user device 112. The application server 106 may be configured to render the UI 814 to present the predicted business outcomes and predicted psychometric features (e.g., the personality and mood attributes) to the target user 110. At 1004, a feedback is received from the target user 110. The application server 106 may be configured to receive the feedback indicating relevancy of the predicted business outcomes and the predicted psychometric features from the target user 110. At 1006, the weight assigned of the link between each voice feature and each psychometric feature is adjusted based on the feedback. The application server 106 may be configured to increase or decrease the weight based on a positive or negative feedback from the target user 110. At 1008, each voice feature is re-mapped with each psychometric feature of the test user 102a based on the adjusted weight of the link between each voice feature and each psychometric feature.

Figure 11:
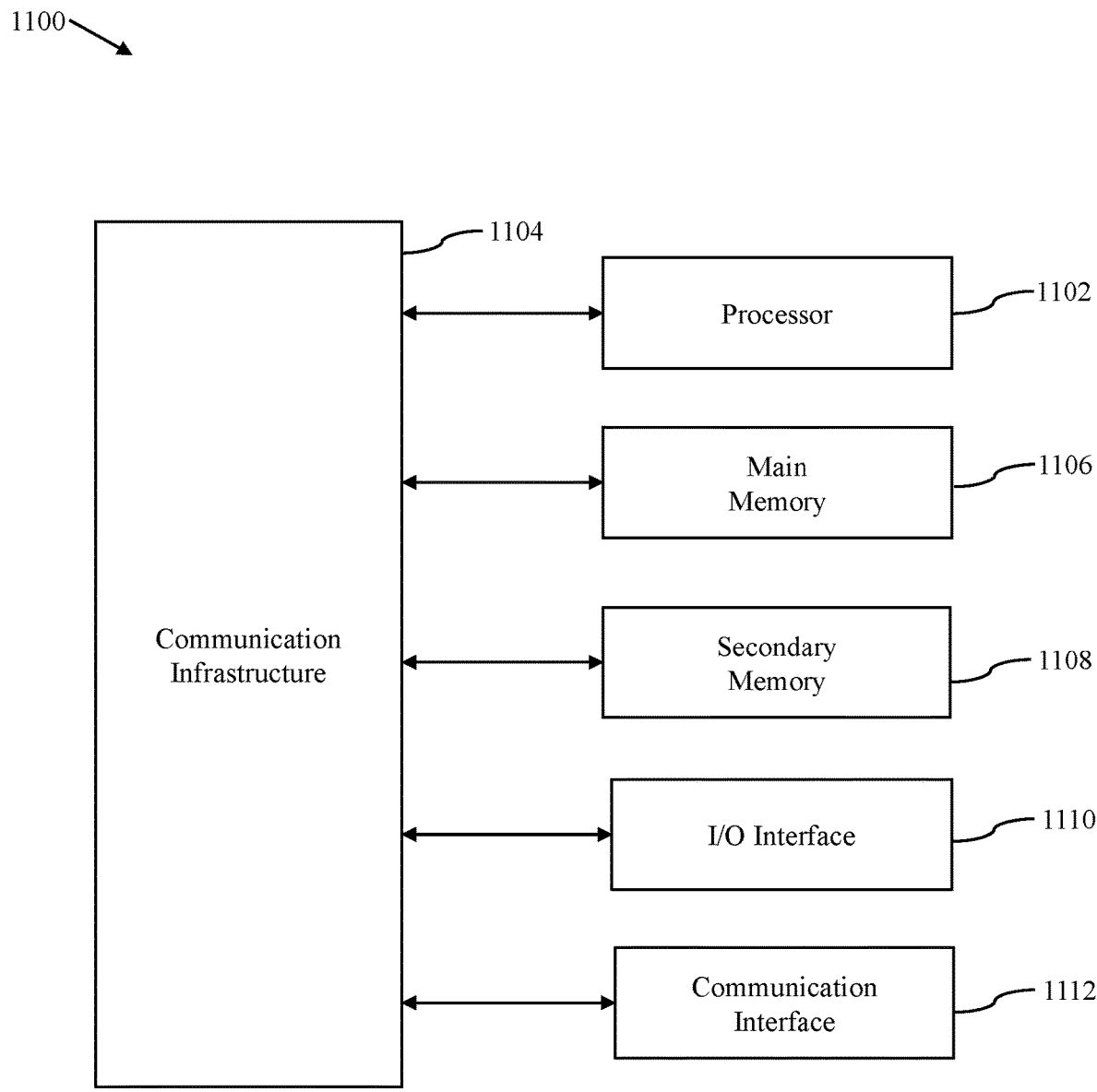
FIG. 11 is a block diagram that illustrates system architecture of a computer system, in accordance with an embodiment of the disclosure.

FIG. 11 is a block diagram that illustrates system architecture of a computer system 1100, in accordance with an embodiment of the disclosure. An embodiment of disclosure, or portions thereof, may be implemented as computer readable code on the computer system 1100. In one example, the test-user and target-user devices 104 and 112 and the database server 108 of FIG. 1 may be implemented in the computer system 1100 using hardware, software, firmware, non-transitory computer readable media having instructions stored thereon, or a combination thereof and may be implemented in one or more computer systems or other processing systems. Hardware, software, or any combination thereof may embody modules and components used to implement the method of FIGS. 9A-9E and 10.

The computer system 1100 may include a processor 1102 that may be a special-purpose or a general-purpose processing device. The processor 1102 may be a single processor, multiple processors, or combinations thereof. The processor 1102 may have one or more processor cores. In one example, the processor 1102 is an octa-core processor. The processor 1102 may be further connected to a communication infrastructure 1104, such as a bus, message queue, multi-core message-passing scheme, and the like. The computer system 1100 may further include a main memory 1106 and a secondary memory 1108. Examples of the main memory 1106 may include RAM, ROM, and the like. The secondary memory 1108 may include a hard disk drive or a removable storage drive, such as a floppy disk drive, a magnetic tape drive, a compact disk, an optical disk drive, a flash memory, and the like. The removable storage drive may further read from and/or write to a removable storage device in a manner known in the art. In one example, if the removable storage drive is a compact disk drive, the removable storage device may be a compact disk. In an embodiment, the removable storage unit may be a non-transitory computer readable recording media.

The computer system 1100 may further include an input/output (I/O) interface 1110 and a communication interface 1112. The I/O interface 1110 may include various input and output devices that are configured to communicate with the processor 1102. Examples of the input devices may include a keyboard, a mouse, a joystick, a touchscreen, a microphone, and the like. Examples of the output devices may include a display screen, a speaker, headphones, and the like. The communication interface 1112 may be configured to allow data to be transferred between the computer system 1100 and various devices that are communicatively coupled to the computer system 1100. Examples of the communication interface 1112 may include a modem, a network interface, i.e., an Ethernet card, a communication port, and the like. Data transferred via the communication interface 1112 may correspond to signals, such as electronic, electromagnetic, optical, or other signals as will be apparent to a person skilled in the art. The signals may travel via a communication channel (not shown) which may be configured to transmit the signals to devices that are communicatively coupled to the computer system 1100. Examples of the communication channel may include, but are not limited to, cable, fiber optics, a phone line, a cellular phone link, a radio frequency link, and the like. The main memory 1106 and the secondary memory 1108 may refer to non-transitory computer readable mediums that may provide data that enables the computer system 1100 to implement the method illustrated in FIGS. 9A-9E.

Various embodiments of the present disclosure include the application server 106 for predicting business outcomes for the target user 110. The application server 106 may retrieve the historical data 306 of the test users 102, voice samples 304 of the test users 102, and answers 308 provided by the test users 102 to a set of psychometric questions. The first processor 202 may analyze the answers 308 and the audio processor 204 may analyze the voice samples 304. The answers 308 may be analyzed for deriving one or more psychometric features 318 of the test users 102. The voice samples 304 may be analyzed for extracting a first set of feature values corresponding to a set of voice features from the voice samples 304. The model generator 212 may generate the predictor models 322 based on the historical data 306 of the test users 102, the first set of feature values, and the one or more psychometric features 318 of the test users 102. The prediction module 216 may predict one or more business outcomes for the target user 110 based on the one or more predictor models 322 and voice samples 404 associated with the target user 110.

In one embodiment, a non-transitory computer readable medium having stored thereon, computer executable instructions, which when executed by a computer, cause the computer to execute operations for predicting business outcomes for the target user 110 (as described in FIGS. 9A-9E). The operations include retrieving the historical data 306 of at least one test user (for example, the test user 102a), a first set of voice samples (i.e., the voice data 304) associated with the test user 102a, and a first set of answers 308 provided by the test user 102a to a set of psychometric questions. The first set of answers 308 is analyzed by the first processor 202 and the first set of voice samples 304 is analyzed by the audio processor 204. The first set of answers 308 is analyzed for deriving one or more psychometric features 318 of the test user 102a. The first set of voice samples 304 is analyzed for extracting a first set of feature values corresponding to a set of voice features from the first set of voice samples 304. The model generator 212 may be configured to generate one or more predictor models 322 based on the historical data 306 of the test user 102a, the first set of feature values, and the one or more psychometric features 318 of the test user 102a. The prediction module 216 may be configured to predict one or more business outcomes for the target user 110 based on the one or more predictor models 322 and a second set of voice samples (i.e., the voice data 404) of the target user 110.

Various embodiments of the disclosure include the application server 106 which may enable the prediction of business outcomes by analyzing the voice data of the target user 110, The voice samples of the target user 110 accurately reflect the subconscious mind of the target user 110 at any given time instance. The predictor models 322 generated by the application server 106 are trained based on the test data 302 of multiple test users 102. The test data 302 includes the voice data 304, the historical data 306, and the answers 308 provided by the test users 102, which reflect the subconscious mind of the test users 102. Due to chronological processing of the voice data 404 based on the date and time markers, behavioral changes exhibited by the target user 110 over a period of time may be accurately monitored. As the subconscious mind is responsible for majority of decision making and directly related to the psychometric orientation, the prediction accuracy of the predictor models 322 is very high. Thus, the disclosure yields more accurate results in comparison to the related techniques. The ability of the predictor models 322 to accurately predict psychometric orientation and business outcomes may provide competitive edge to a service company, utilizing the predictor models 322, over its competitors. For example, the service company may utilize the technological improvements provided by the predictor models 322 to provide targeted services to the customers. Similarly, the technological improvements provided by the predictor models 322 allows an organization to efficiently keep track of behavioral changes and mental health of corresponding employees by periodically analyzing employees' voice samples, rather than hire a psychiatrist or conduct time consuming psychometric tests. The technological improvements provided by the predictor models 322 may be utilized to concurrently predict business outcomes for multiple target users, thereby reducing the time spent by organizations on data analytics for various operations, such as hiring, or the like. The disclosure has applicability in all such areas that are customer and employee centric. For example, e-commerce industries, business ventures, customer helpdesks, travel industries, financial industries, insurance agencies, or the like.

A person of ordinary skill in the art will appreciate that embodiments and exemplary scenarios of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. The operations may be further described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the disclosure provide, among other features, systems and methods for predicting business outcomes. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method for predicting business outcomes for users, the method comprising:
   retrieving, by a server, historical data of at least one test user, a first set of answers provided by the test user to a set of psychometric questions, and a first set of voice samples of the test user;
   analyzing, by the server, the first set of answers to the set of psychometric questions;
   deriving one or more personality and mood attributes of the test user from the answers to the psychometric questions;
   analyzing, by the server, the first set of voice samples;
   deriving, by the server, a first set of voice feature values corresponding to a set of voice features from the first set of voice samples;
   generating, by the server, one or more predictor models based on the historical data of the test user, the one or more personality and mood attributes of the test user, and the first set of voice feature values from the analyzed first set of voice samples;
   retrieving, by a server, historical data of at least one target user, and a second set of answers provided by the target user to a set of psychometric questions;
   obtaining, by the server, a second set of voice samples, wherein the second set of voice samples are from a target user;
   analyzing, by the server, the second set of answers to the set of psychometric questions;
   deriving, by the server, one or more personality and mood attributes of the target user from the answers to the psychometric questions;
   predicting, by the server, one or more personality and mood attributes of the target user from the answers to the psychometric questions via the one or more predictor models;
   providing, by the server, the second set of voice samples to the one or more predictor models;
   analyzing, by the server, the second set of voice samples;
   predicting, by the server, one or more business outcomes for the target user based on the one or more predictor models applied to the second set of voice samples for the target user and one or more derived and predicted personality and mood attributes for the target user generated from the second set of voice samples;
   determining, by the server, one or more behavioral changes exhibited by the target user over a time period based on the chronological extraction from each voice sample of the second set of voice samples; and
   predicting, by the server, the one of more business outcomes for the target user based on the one or more behavioral changes exhibited by the target user.

2. The method of claim 1, wherein the one or more business outcomes include at least one of employment affinity, product purchase affinity, purchase behavior, or job affinity of the target user.

3. The method of claim 1, wherein the set of voice features include at least one of paralinguistic features, linguistic features, or sound features.

4. The method of claim 1, further comprising analyzing, by the server, the second set of voice samples for extracting a second set of voice feature values corresponding to the set of voice features from the second set of voice samples, wherein the second set of voice feature values is used as input to the one or more predictor models for predicting the one or more business outcomes.

5. The method of claim 4, further comprising predicting, by the server, one or more personality and mood attributes of the target user based on the second set of voice feature values, wherein the one or more personality and mood attributes are used as input to the one or more predictor models for predicting the one or more business outcomes.

6. The method of claim 1, further comprising analyzing, by the server, a second set of answers provided by the target user to the set of psychometric questions for deriving one or more personality and mood attributes of the target user, wherein the one or more personality and mood attributes of the target user are further used as input to the one or more predictor models for predicting the one or more business outcomes.

7. The method of claim 1, further comprising:
   mapping, by the server, each voice feature in the set of voice features with each personality and mood attributes of the test user based on the first set of voice feature values to generate a link therebetween; and
   assigning, by the server, a weight to the link between each voice feature in the set of voice features and each personality and mood attributes of the test user for generating the one or more predictor models.

8. The method of claim 7, further comprising rendering, by the server, on a user device of the target user, a user interface for presenting the one or more business outcomes to the target user.

9. The method of claim 8, further comprising receiving, by the server, a feedback provided by the target user on the one or more business outcomes, wherein the target user provides the feedback by way of the user interface.

10. The method of claim 9, further comprising updating, by the server, the weight of the link between each voice feature in the set of voice features and each personality and mood attributes of the of the test user based on the feedback for updating the one or more predictor models.

11. The method of claim 1, wherein the historical data includes at least one of educational qualification, job profile, purchase history, travel history, likes, or dislikes of the test user.

12. A system for predicting business outcomes for users, the system comprising:
   a server that is configured to:
      retrieve historical data of at least one test user, a first set of answers provided by the test user to a set of psychometric questions, and a first set of voice samples of the test user;
      analyze the first set of answers to the set of psychometric questions;
      derive one or more personality and mood attributes of the test user from the answers to the psychometric questions;
      analyze the first set of voice samples;
      derive a first set of voice feature values corresponding to a set of voice features from the first set of voice samples;

generate one or more predictor models based on the historical data of the test user, the one or more personality and mood attributes of the test user, and the first set of voice feature values from the analyzed set of voice samples;

retrieve historical data of at least one target user, and a second set of answers provided by the target user to a set of psychometric questions;

obtain a second set of voice samples, wherein the second set of voice samples are from a target user;

analyze the second set of answers to the set of psychometric questions;

derive one or more personality and mood attributes of the target user from the answers to the psychometric questions;

predict one or more personality and mood attributes of the target user from the answers to the psychometric questions via the one or more predictor models;

provide the second set of voice samples to the one or more predictor models;

analyze the second set of voice samples;

predict one or more business outcomes for the target user based on the one or more predictor models applied to the second set of voice samples for the target user and one or more derived and predicted personality and mood attributes for the target user generated from the second set of voice samples;

determine one or more behavioral changes exhibited by the target user over a time period based on the chronological extraction from each voice sample of the second set of voice sample; and predict the one or more business outcomes for the target user based on the one or more behavioral changes exhibited by the target user.

13. The system of claim 12, wherein the server is further configured to analyze the second set of voice samples for extracting a second set of voice feature values corresponding to the set of voice features from the second set of voice samples, wherein the second set of voice feature values is used as input to the one or more predictor models for predicting the one or more business outcomes.

14. The system of claim 13, wherein the server is further configured to predict one or more personality and mood attributes of the target user based on the second set of voice feature values, wherein the one or more personality and mood attributes are used as input to the one or more predictor models for predicting the one or more business outcomes.

15. The system of claim 12, wherein the server is further configured to analyze a second set of answers provided by the target user to the set of psychometric questions for deriving one or more personality and mood attributes of the target user, wherein the one or more personality and mood attributes of the target user are further used as input to the one or more predictor models for predicting the one or more business outcomes.

16. The system of claim 12, wherein the server is further configured to:

map each voice feature in the set of voice features with each personality and mood attributes of the test user based on the first set of voice feature values to generate a link therebetween, and assign a weight to the link between each voice feature in the set of voice features and each personality and mood attributes of the test user for generating the one or more predictor models.

17. The system of claim 16, wherein the server is further configured to render, on a user device of the target user, a user interface for presenting the one or more business outcomes to the target user.

18. The system of claim 17, wherein the server is further configured to receive a feedback provided by the target user on the one or more business outcomes, wherein the target user provides the feedback by way of the user interface.

19. The system of claim 18, wherein the server is further configured to update the weight of the link between each voice feature in the set of voice features and each personality and mood attributes of the of the test user based on the feedback for updating the one or more predictor models.

20. A non-transitory computer readable medium having stored thereon, computer executable instructions, which when executed by a computer, cause the computer to execute operations, the operations comprising:

retrieving historical data of at least one test user, a first set of answers provided by the test user to a set of psychometric questions, and a first set of voice samples of the test user;

analyzing the first set of answers to the set of psychometric questions;

deriving one or more personality and mood attributes of the test user;

analyzing-the first set of voice samples to extract a first set of voice feature values corresponding to a set of voice features from the first set of voice samples;

generating one or more predictor models based on the historical data of the test user, the one or more personality and mood attributes, and the first set of voice feature values;

retrieving historical data of at least one target user, and a second set of answers provided by the target user to a set of psychometric questions;

obtaining a second set of voice samples, wherein the second set of voice samples are from a target user;

analyzing the second set of answers to the set of psychometric questions;

deriving one or more personality and mood attributes of the target user from the answers to the psychometric questions;

predicting one or more personality and mood attributes of the target user from the answers to the psychometric questions via the one or more predictor models;

providing the second set of voice samples to the one or more predictor models;

analyzing the second set of voice samples;

predicting one or more business outcomes for the target user based on the one or more generated predictor models applied to the second set of voice samples for the target user and one or more derived and predicted personality and mood attributes for the target user generated from the second set of voice samples;

determining, by the server, one or more behavioral changes exhibited by the target user over a time period based on the chronological extraction from each voice sample of the second set of voice samples; and predicting, by the server, the one of more business outcomes for the target user based on the one or more behavioral changes exhibited by the target user.

* * * * *